US012563524B2

(12) United States Patent
Du et al.

(10) Patent No.: US 12,563,524 B2
(45) Date of Patent: Feb. 24, 2026

(54) METHOD AND APPARATUS FOR MONITORING EVENT CONFIGURATION

(71) Applicant: Telefonaktiebolaget LM Ericsson (publ), Stockholm (SE)

(72) Inventors: Yan Du, Shanghai (CN); Wenliang Xu, Shanghai (CN); Yunjie Lu, Shanghai (CN); Xiaoming Li, Shanghai (CN); Xuemei Zhang, Shanghai (CN); Lei Xia, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 351 days.

(21) Appl. No.: 18/032,849

(22) PCT Filed: Oct. 22, 2021

(86) PCT No.: PCT/CN2021/125712
§ 371 (c)(1),
(2) Date: Apr. 20, 2023

(87) PCT Pub. No.: WO2022/083736
PCT Pub. Date: Apr. 28, 2022

(65) Prior Publication Data
US 2023/0300783 A1      Sep. 21, 2023

(30) Foreign Application Priority Data
Oct. 23, 2020    (WO) ................ PCT/CN2020/123263

(51) Int. Cl.
*H04W 64/00*          (2009.01)
(52) U.S. Cl.
CPC ................................ *H04W 64/006* (2013.01)

(58) Field of Classification Search
CPC ....... H04W 8/06; H04W 36/12; H04W 60/04; H04W 92/02; H04W 76/22; H04W 60/00;
(Continued)

(56) References Cited

U.S. PATENT DOCUMENTS

2008/0165740 A1*   7/2008   Bachmann .......... H04L 63/0869
                                              370/332
2018/0279115 A1*   9/2018   Tanna .................... H04W 8/04
(Continued)

FOREIGN PATENT DOCUMENTS

EP            3373620 A1     9/2018

OTHER PUBLICATIONS

Author Unknown, "Technical Specification Group Services and System Aspects; Architecture enhancements to facilitate communications with packet data networks and applications (Release 15)," Technical Specification 23.682, Version 15.10.0, Dec. 2019, 3GPP Organizational Partners, 127 pages.
(Continued)

*Primary Examiner* — Nimesh Patel
(74) *Attorney, Agent, or Firm* — Withrow & Terranova, PLLC

(57) ABSTRACT

Embodiments of the present disclosure provide method and apparatus for monitoring event configuration. A method performed by a first mobile management node comprises receiving information regarding a first interworking service capability exposure function (IWK-SCEF) from a second mobile management node. The method further comprises determining whether the first mobile management node and the second mobile management node use a same IWK-SCEF based on the information regarding the first IWK-SCEF. The method further comprises sending an indication of whether the first mobile management node and the second mobile management node use the same IWK-SCEF to the second mobile management node.

23 Claims, 10 Drawing Sheets

(58) Field of Classification Search

CPC ... H04W 76/12; H04W 84/042; H04W 48/18; H04W 76/11; H04W 8/08; H04W 24/02; H04W 60/06; H04W 8/02; H04W 8/18; H04W 88/14; H04W 8/20; H04W 76/18; H04W 36/0066; H04W 8/24; H04W 48/02; H04W 36/144; H04W 76/16; H04W 36/0033; H04W 4/029; H04W 48/04; H04W 16/14; H04W 88/16; H04W 28/24; H04W 36/0038; H04W 16/18; H04W 8/005; H04W 36/0058; H04W 28/0289; H04W 36/00; H04W 36/0016; H04W 92/04; H04W 36/0083; H04W 36/13; H04W 36/0088; H04W 40/36; H04W 72/52; H04W 16/24; H04W 36/362; H04W 28/08; H04W 80/04; H04W 76/15; H04W 88/08; H04W 36/14; H04W 76/10; H04W 88/06; H04W 92/12; H04W 36/18; H04W 8/12; H04W 8/04; H04W 36/08; H04W 72/04; H04W 36/16; H04W 52/386; H04W 36/0085; H04W 76/00; H04W 36/0079; H04W 92/14; H04W 36/302; H04W 72/12; H04W 72/54; H04W 28/18; H04W 36/00837; H04W 36/305; H04W 36/30; H04W 74/00; H04W 8/082; H04W 28/16; H04W 36/0061; H04L 67/51; H04L 65/1016; H04L 5/0055; H04L 67/141; H04L 65/1069; H04L 67/14; H04L 41/0894; H04L 47/801; H04L 41/5009; H04L 41/12; H04L 41/5096; H04L 12/4633; H04L 12/1407; H04L 2212/00; H04L 9/40; H04L 69/16; H04L 69/164; H04L 69/161; H04L 63/08; H04L 2209/80; Y02D 30/70; Y02D 30/50; H04B 7/0452; H04B 7/0689; H04B 17/382; H04B 7/06964; H04M 15/66; H04M 15/8228; H04M 15/8038; H04M 15/8214; H04M 15/8016; H04M 15/50; H04M 15/60; H04M 15/7655; H04M 15/773; H04M 2215/32; H04M 15/58; H04M 15/49; G06F 2009/45595; G06F 2209/509; G06F 9/45533; G06F 2009/45587; G06F 9/45558; G06F 11/3466; G06F 11/3409; G06N 20/00; G06N 3/063; G06N 5/01; G01S 5/06; G01S 5/0218; G01S 5/0215; G01S 5/04; G01S 5/10; G01S 13/34

See application file for complete search history.

(56) References Cited

U.S. PATENT DOCUMENTS

| | | | | |
|---|---|---|---|---|
| 2018/0324652 | A1* | 11/2018 | Ryu | H04W 36/08 |
| 2018/0376384 | A1* | 12/2018 | Youn | H04W 36/144 |
| 2019/0124671 | A1* | 4/2019 | Starsinic | H04W 12/06 |
| 2020/0007414 | A1* | 1/2020 | Smith | H04L 67/12 |
| 2020/0120475 | A1* | 4/2020 | Gupta | H04W 8/06 |
| 2020/0178123 | A1* | 6/2020 | Shan | H04W 36/0016 |

OTHER PUBLICATIONS

Author Unknown, "Technical Specification Group Core Network and Terminals; 3GPP Evolved Packet System (EPS); Evolved General Packet Radio Service (GPRS) Tunnelling Protocol for Control plane (GTPv2-C); Stage 3; (Release 16)," Technical Specification 29.274, Version 16.9.0, Sep. 2021, 3GPP Organizational Partners, 408 pages.

Extended European Search Report for European Patent Application No. 21882148.6, mailed Aug. 28, 2024, 10 pages.

Author Unknown, "Technical Specification Group Services and System Aspects; General Packet Radio Service (GPRS) enhancements for Evolved Universal Terrestrial Radio Access Network (E-UTRAN) access (Release 16)," Technical Specification 23.401, Version 16.8.0, Sep. 2020, 3GPP Organizational Partners, 440 pages.

Author Unknown, "Technical Specification Group Services and System Aspects; Architecture enhancements to facilitate communications (Release 16)," Technical Specification 23.682, Version 16.7.0, Jul. 2020, 3GPP Organizational Partners, 134 pages.

Author Unknown, "Technical Specification Group Services and System Aspects; Architecture enhancements to facilitate communications with packet data networks and applications (Release 16)," Technical Specification 23.682, Version 16.8.0, Sep. 2020, 3GPP Organizational Partners, 135 pages.

Author Unknown, "Technical Specification Group Core Network and Terminals; Mobility Management Entity (MME) and Serving GPRS Support Node (SGSN) interfaces for interworking with packet data networks and applications (Release 16)," Technical Specification 29.128, Version 16.1.0, Mar. 2020, 3GPP Organizational Partners, 51 pages.

Author Unknown, "Technical Specification Group Core Network and Terminals; 3GPP Evolved Packet System (EPS); Evolved General Packet Radio Service (GPRS) Tunnelling Protocol for Control plane (GTPv2-C); Stage 3; (Release 16)," Technical Specification 29.274, Version 16.4.0, Jun. 2020, 3GPP Organizational Partners, 393 pages.

Author Unknown, "Technical Specification Group Core Network and Terminals; 3GPP Evolved Packet System (EPS); Evolved General Packet Radio Service (GPRS) Tunnelling Protocol for Control plane (GTPv2-C); Stage 3; (Release 16)," Technical Specification 29.274, Version 16.5.0, Sep. 2020, 3GPP Organizational Partners, 396 pages.

Author Unknown, "Technical Specification Group Core Network and Terminals; 3GPP Evolved Packet System (EPS); Evolved General Packet Radio Service (GPRS) Tunnelling Protocol for Control plane (GTPv2-C); Stage 3; (Release 16)," Technical Specification 29.274, Version 16.7.0, Mar. 2021, 3GPP Organizational Partners, 407 pages.

Calhoun, et al., "Diameter Base Protocol," Request for Comments 3588, Sep. 2003, The Internet Society, 127 pages.

Ericsson, "C4-205354: IWK-SCEF ID for Monitoring Event Configuration," 3GPP TSG-CT WG4 Meeting #101e, Oct. 15, 2020, Electronic Meeting, 41 pages.

International Search Report and Written Opinion for International Patent Application No. PCT/CN2021/125712, mailed Jan. 29, 2022, 11 pages.

* cited by examiner

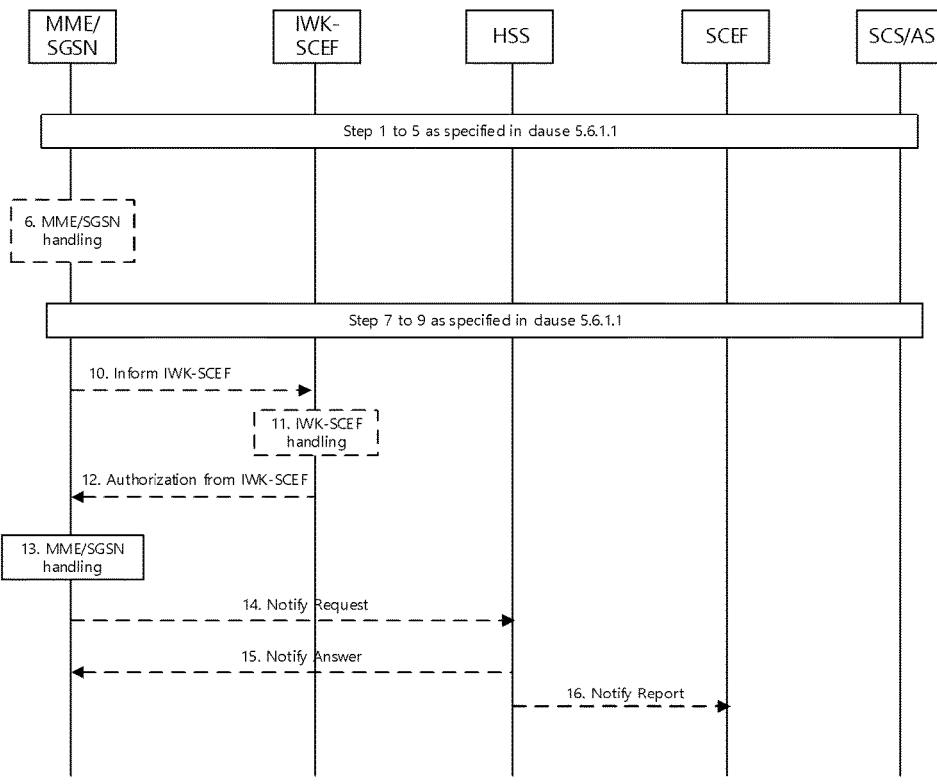

| MME/SGSN | IWK-SCEF | HSS | SCEF | SCS/AS |
| --- | --- | --- | --- | --- |

Step 1 to 5 as specified in clause 5.6.1.1

6. MME/SGSN handling

Step 7 to 9 as specified in clause 5.6.1.1

10. Inform IWK-SCEF

11. IWK-SCEF handling

12. Authorization from IWK-SCEF

13. MME/SGSN handling

14. Notify Request

15. Notify Answer

16. Notify Report

Receiving information regarding a first interworking service capability exposure function (IWK-SCEF) from a second mobile management node

304

Determining whether the first mobile management node and the second mobile management node use a same IWK-SCEF based on the information regarding the first IWK-SCEF

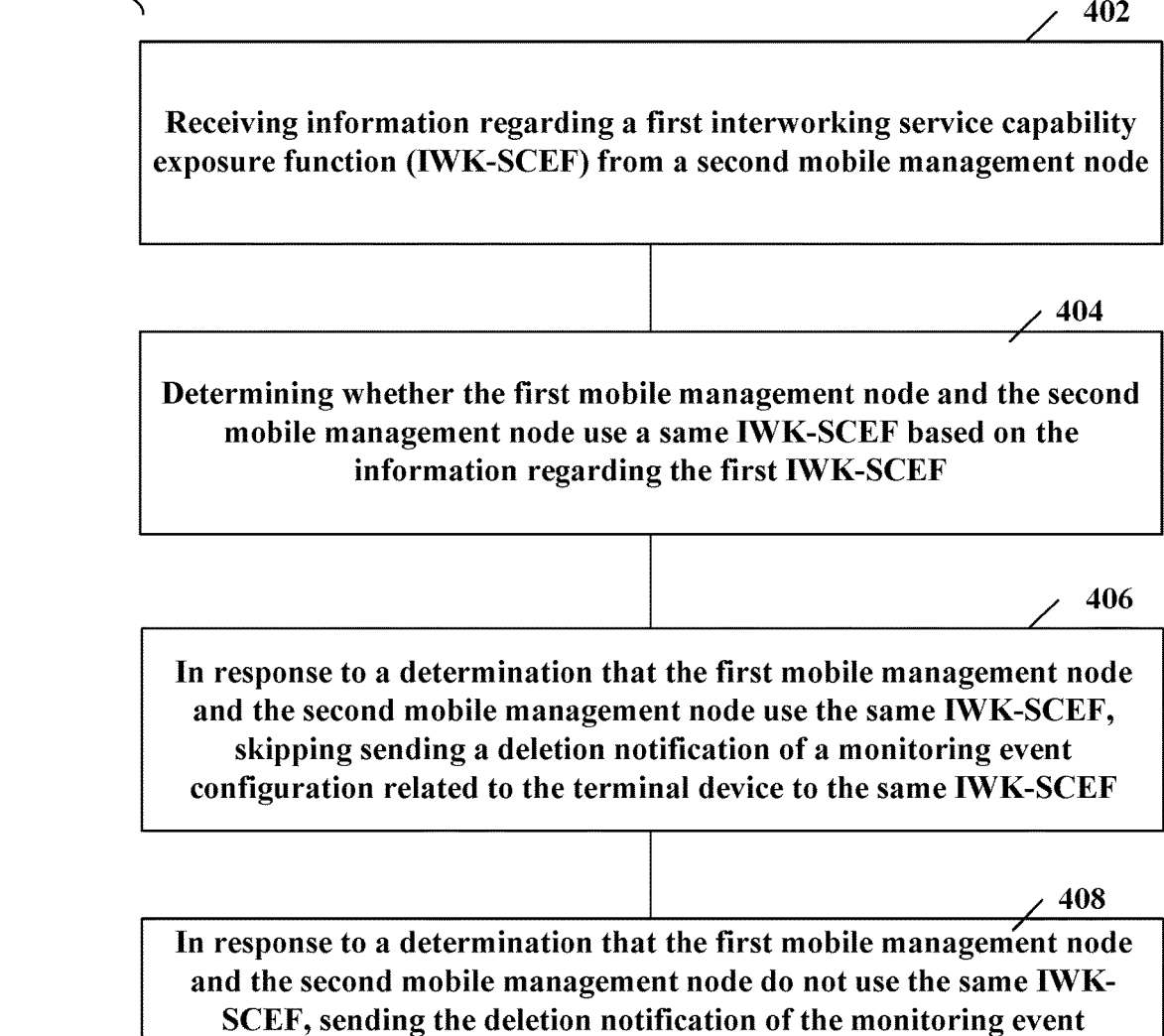

402

Receiving information regarding a first interworking service capability exposure function (IWK-SCEF) from a second mobile management node

404

Determining whether the first mobile management node and the second mobile management node use a same IWK-SCEF based on the information regarding the first IWK-SCEF

406

In response to a determination that the first mobile management node and the second mobile management node use the same IWK-SCEF, skipping sending a deletion notification of a monitoring event configuration related to the terminal device to the same IWK-SCEF

408

In response to a determination that the first mobile management node and the second mobile management node do not use the same IWK-SCEF, sending the deletion notification of the monitoring event configuration related to the terminal device to the IWK-SCEF used by the first mobile management node

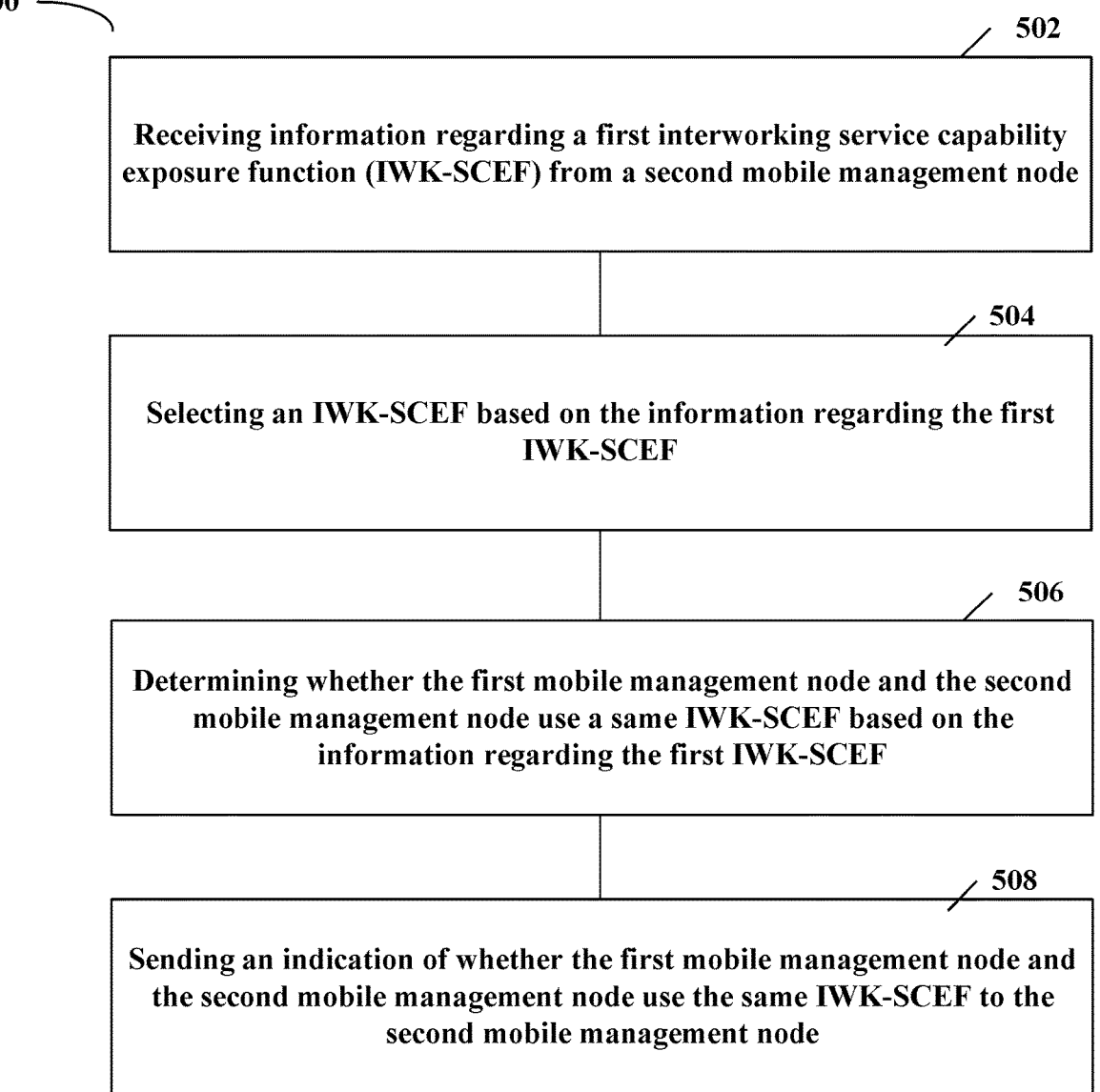

502

Receiving information regarding a first interworking service capability exposure function (IWK-SCEF) from a second mobile management node

504

Selecting an IWK-SCEF based on the information regarding the first IWK-SCEF

506

Determining whether the first mobile management node and the second mobile management node use a same IWK-SCEF based on the information regarding the first IWK-SCEF

508

Sending an indication of whether the first mobile management node and the second mobile management node use the same IWK-SCEF to the second mobile management node

Figures 6, 7:
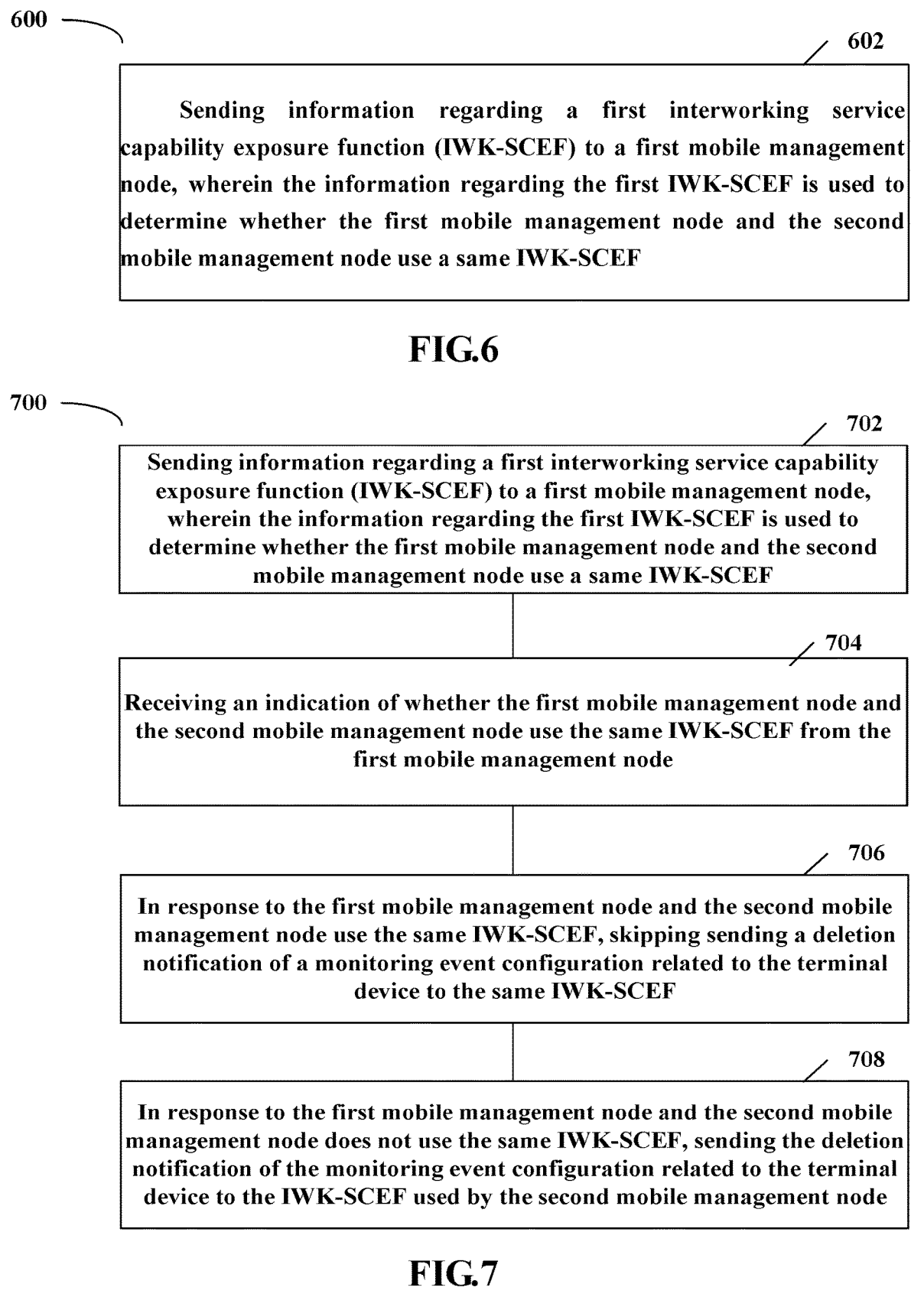

Sending information regarding a first interworking service capability exposure function (IWK-SCEF) to a first mobile management node, wherein the information regarding the first IWK-SCEF is used to determine whether the first mobile management node and the second mobile management node use a same IWK-SCEF

Sending information regarding a first interworking service capability exposure function (IWK-SCEF) to a first mobile management node, wherein the information regarding the first IWK-SCEF is used to determine whether the first mobile management node and the second mobile management node use a same IWK-SCEF

704

Receiving an indication of whether the first mobile management node and the second mobile management node use the same IWK-SCEF from the first mobile management node

706

In response to the first mobile management node and the second mobile management node use the same IWK-SCEF, skipping sending a deletion notification of a monitoring event configuration related to the terminal device to the same IWK-SCEF

708

In response to the first mobile management node and the second mobile management node does not use the same IWK-SCEF, sending the deletion notification of the monitoring event configuration related to the terminal device to the IWK-SCEF used by the second mobile management node

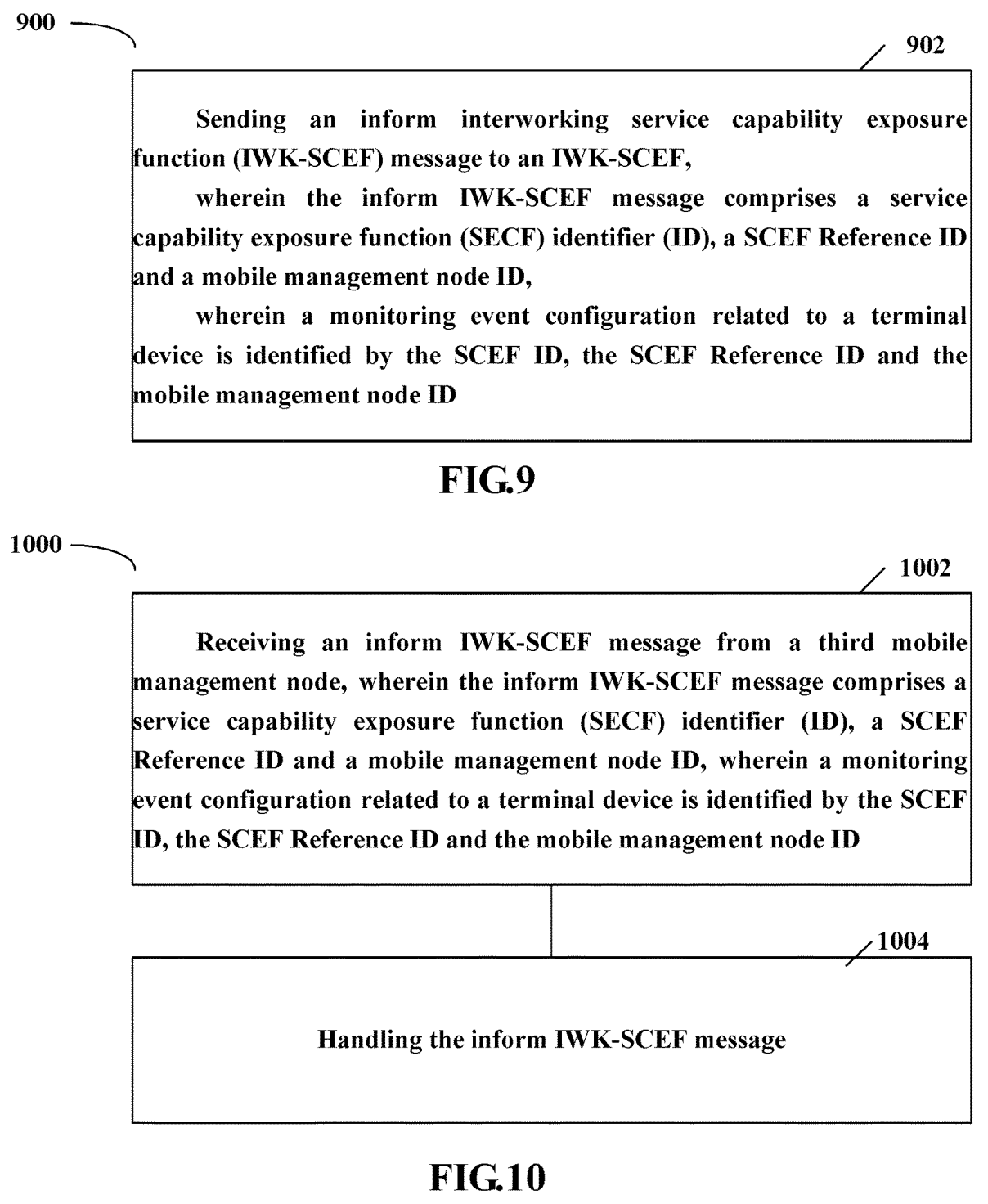

> Sending an inform interworking service capability exposure function (IWK-SCEF) message to an IWK-SCEF,
>
> wherein the inform IWK-SCEF message comprises a service capability exposure function (SECF) identifier (ID), a SCEF Reference ID and a mobile management node ID,
>
> wherein a monitoring event configuration related to a terminal device is identified by the SCEF ID, the SCEF Reference ID and the mobile management node ID

> Receiving an inform IWK-SCEF message from a third mobile management node, wherein the inform IWK-SCEF message comprises a service capability exposure function (SECF) identifier (ID), a SCEF Reference ID and a mobile management node ID, wherein a monitoring event configuration related to a terminal device is identified by the SCEF ID, the SCEF Reference ID and the mobile management node ID

/ 1004

> Handling the inform IWK-SCEF message

FIG.10

METHOD AND APPARATUS FOR MONITORING EVENT CONFIGURATION

This application is a 35 U.S.C. § 371 national phase filing of International Application No. PCT/CN2021/125712, filed Oct. 22, 2021, which claims the benefit of International Application No. PCT/CN2020/123263, filed Oct. 23, 2020, the disclosures of which are incorporated herein by reference in their entireties.

TECHNICAL FIELD

The non-limiting and exemplary embodiments of the present disclosure generally relate to the technical field of communications, and specifically to methods and apparatuses for monitoring event configuration.

BACKGROUND

This section introduces aspects that may facilitate a better understanding of the disclosure. Accordingly, the statements of this section are to be read in this light and are not to be understood as admissions about what is in the prior art or what is not in the prior art.

The Service Capability Exposure Function (SCEF) and Interworking SCEF (IWK-SCEF) are described in 3rd Generation Partnership Project (3GPP) TS 23.682 V16.8.0, the disclosure of which is incorporated by reference herein in its entirety.

The SCEF provides a means to securely expose the services and capabilities provided by 3GPP network interfaces. The SCEF may provide various services and capabilities such as monitoring events.

The IWK-SCEF is optional. When deployed, the IWK-SCEF may be located in VPLMN (visited Public Land Mobile Network) for inter-connection with the SCEF of HPLMN (home Public Land Mobile Network). The IWK-SCEF receives Monitoring Event Reports from underlying entities and sends them to the SCEF. The IWK-SCEF relays non-IP (Internet protocol) data between a serving general packet radio service support node (SGSN)/a mobile management entity (MME) and the SCEF. The functionality of the IWK-SCEF may include the following:

Storing of state information to identify e.g. the connection to SCEF; and

Forwarding messages between the serving PLMN and HPLMN SCEF; and

Authorization of monitoring request; and

Storing of monitoring request during its life time;

Normalization of reports according to roaming agreement between VPLMN and HPLMN, e.g. change the location granularity (from cell level to a level appropriate for the HPLMN) of Monitoring Event Reports received from the underlying entities; and Optionally, generate charging/accounting information.

If the IWK-SCEF is deployed, SGSN/MME may send MEC (monitoring event configuration) to the IWK-SCEF for authorization before any monitoring event reporting. The IWK-SCEF may store the MEC for the function implementation listed above. And the IWK-SCEF may use the SCEF-ID (identifier) and SCEF-Reference-ID information received as a unique identifier of a MEC.

The monitoring events feature is intended for monitoring of specific events in a system (such as 3GPP system) and making such monitoring events information available via the SCEF. If a monitoring event is detected, the network might be configured to perform special actions, e.g. limit a user equipment (UE) access. There may be various monitoring events that can be configured and reported. For example, the monitoring events may comprise at least one of:

Monitoring the association of the UE and UICC (Universal Integrated Circuit Card) and/or new IMSI-IMEI-SV (International Mobile Subscriber Identity-International Mobile Equipment Identity-Software Version) association;

UE reachability;

location of the UE, and a change in location of the UE;

Loss of connectivity;

Communication failure;

Roaming status (i.e. Roaming or No Roaming) of the UE, and change in roaming status of the UE;

Number of UEs present in a geographical area;

Availability after DDN (Downlink Data Notification) failure; and

PDN (Packet Data Network) Connectivity Status.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In mobility procedures, a UE may move from an old SGSN/MME node to a new SGSN/MME node. The MEC related to the UE may be loaded in the new SGSN/MME node and removed from the old SGSN/MME node. When the IWK-SCEF is deployed, the MEC should be updated to IWK-SCEF accordingly.

For the new SGSN/MME node, a new authorization request with MEC may be sent to the IWK-SCEF. However the old SGSN/MME has no information regarding whether the new SGSN/MME will use an IWK-SCEF and the new SGSN/MME also has no information regarding the IWK-SCEF used by the old SGSN/MME. In addition, when the new SGSN/MME will use an IWK-SCEF, the old SGSN/MME and the new SGSN/MME do not know whether they use the same IWK-SCEF or not.

If the old SGSN/MME does not notify the IWK-SCEF to remove the MEC and the new SGSN/MME uses another IWK-SCEF node, the MEC may be hanged on the old IWK-SCEF node. The useless data may be accumulated and occupy storage resource of the IWK-SCEF node.

If the old SGSN/MME notifies the IWK-SCEF to remove the MEC and the new SGSN/MME still use the same IWK-SCEF node, the MEC may be wrongly deleted on the IWK-SCEF node. For example, the IWK-SCEF may use the SCEF-ID and SCEF-Reference-ID information as a unique identifier of a MEC. When a message for deleting the MEC from the old SGSN/MME may arrive later than the authorization request from the new SGSN/MME, the IWK-SCEF may update the MEC first and then delete the MEC later. Then the monitoring event reporting may not correctly work after that. The old MME/SGSN may unexpectedly delete the Monitoring Event Configuration on IWK-SCEF, which may lead to Monitoring Event reporting failure for roaming UEs.

To overcome or mitigate at least one of the above mentioned problems or other problems, an improved monitoring event configuration solution may be desirable.

In a first aspect of the disclosure, there is provided a method performed by a first mobile management node. The method comprises receiving information regarding a first interworking service capability exposure function (IWK- SCEF) from a second mobile management node. The method further comprises determining whether the first mobile management node and the second mobile management node use a same IWK-SCEF based on the information regarding the first IWK-SCEF. The method further comprises sending an indication of whether the first mobile management node and the second mobile management node use the same IWK-SCEF to the second mobile management node.

In an embodiment, the step of receiving and determining are performed during a mobility procedure of a terminal device moving from the first mobile management function to the second mobile management function.

In an embodiment, the mobility procedure comprises at least one of a tracking area update procedure or a handover procedure.

In an embodiment, the information regarding the first IWK-SCEF is comprised in at least one of a Context Request; a Context Acknowledge message; a Forward Relocation Response; or a Forward Relocation Complete Notification message.

In an embodiment, the method may further comprise, in response to a determination that the first mobile management node and the second mobile management node use the same IWK-SCEF, skipping sending a deletion notification of a monitoring event configuration related to the terminal device to the same IWK-SCEF.

In an embodiment, the method may further comprise, in response to a determination that the first mobile management node and the second mobile management node do not use the same IWK-SCEF, sending the deletion notification of the monitoring event configuration related to the terminal device to the IWK-SCEF used by the first mobile management node.

In an embodiment, the deletion notification of the monitoring event configuration may be comprised in an inform IWK-SCEF message.

In an embodiment, the step of receiving and determining are performed during a mobility procedure of a terminal device moving has moved from the second mobile management function to the first mobile management function.

In an embodiment, the mobility procedure comprises at least one of a tracking area update procedure or a handover procedure.

In an embodiment, the information regarding the first IWK-SCEF is comprised in at least one of a Context Response; or a Forward Relocation Request.

In an embodiment, the method may further comprise selecting an IWK-SCEF based on the information regarding the first IWK-SCEF.

In an embodiment, selecting the IWK-SCEF based on the information regarding the first IWK-SCEF comprises selecting the same IWK-SCEF as the IWK-SCEF used by the second mobile management node.

In an embodiment, the indication is comprised in at least one of Context Acknowledge message; Forward Relocation Response; or Forward Relocation Complete Notification message.

In an embodiment, when the second mobile management node uses the first IWK-SCEF, the information regarding the first IWK-SCEF comprises the Diameter HOST and REALM information of the first IWK-SCEF.

In an embodiment, determining whether the first mobile management node and the second mobile management node use the same IWK-SCEF based on the information regarding the first IWK-SCEF comprises: when the first mobile management node uses the first IWK-SCEF and the information regarding the first IWK-SCEF indicates that the second mobile management node uses the first IWK-SCEF, determining that the first mobile management node and the second mobile management node use the same IWK-SCEF; when the first mobile management node uses another IWK-SCEF and the information regarding the first IWK-SCEF indicates that the second mobile management node uses the first IWK-SCEF, determining that the first mobile management node and the second mobile management node do not use the same IWK-SCEF; or when the first mobile management node uses the first IWK-SCEF and the information regarding the first IWK-SCEF indicates that the second mobile management node does not use any IWK-SCEF, determining that the first mobile management node and the second mobile management node do not use the same IWK-SCEF.

In an embodiment, the first mobile management node comprises serving general packet radio service support node (SGSN) or mobile management entity (MME).

In a second aspect of the disclosure, there is provided a method performed by a second mobile management node. The method comprises sending information regarding a first interworking service capability exposure function (IWK-SCEF) to a first mobile management node. The method further comprises receiving an indication of whether the first mobile management node and the second mobile management node use the same IWK-SCEF from the first mobile management node. The information regarding the first IWK-SCEF is used to determine whether the first mobile management node and the second mobile management node use a same IWK-SCEF.

In an embodiment, the step of sending is performed during a mobility procedure of a terminal device moving from the first mobile management function to the second mobile management function.

In an embodiment, the step of sending is performed during a mobility procedure of a terminal device moving from the second mobile management function to the first mobile management function.

In an embodiment, the indication is comprised in at least one of Context Acknowledge message; Forward Relocation Response; or Forward Relocation Complete Notification message.

In an embodiment, the method further comprises in response to the first mobile management node and the second mobile management node use the same IWK-SCEF, skipping sending a deletion notification of a monitoring event configuration related to the terminal device to the same IWK-SCEF; or in response to the first mobile management node and the second mobile management node does not use the same IWK-SCEF, sending the deletion notification of the monitoring event configuration related to the terminal device to the IWK-SCEF used by the second mobile management node.

In an embodiment, the deletion notification of the monitoring event configuration is comprised in an inform IWK-SCEF message.

In an embodiment, when the second mobile management node uses the first IWK-SCEF, the information regarding the first IWK-SCEF comprises the Diameter HOST and REALM information of the first IWK-SCEF.

In an embodiment, the second mobile management node comprises serving general packet radio service support node (SGSN) or mobile management entity (MME).

In a third aspect of the disclosure, there is provided a method performed by a third mobile management node. The method comprises sending an inform interworking service capability exposure function (IWK-SCEF) message to an IWK-SCEF. The inform IWK-SCEF message comprises a service capability exposure function (SCEF) identifier (ID), a SCEF Reference ID and a mobile management node ID. A monitoring event configuration related to a terminal device is identified by the SCEF ID, the SCEF Reference ID and the mobile management node ID.

In an embodiment, the third mobile management node ID comprises at least one of Origin-Host and Origin-Realm; or Fully Qualified Domain Name.

In an embodiment, during a mobility procedure of the terminal device moving from the third mobile management function to another mobile management function, the inform IWK-SCEF message further comprises a deletion notification of the monitoring event configuration related to the terminal device.

In an embodiment, the third mobile management node comprises serving general packet radio service support node (SGSN) or mobile management entity (MME).

In a fourth aspect of the disclosure, there is provided a method performed by an interworking service capability exposure function (IWK-SCEF). The method comprises receiving an inform IWK-SCEF message from a third mobile management node. The method further comprises handling the inform IWK-SCEF message. The inform IWK-SCEF message comprises a service capability exposure function (SCEF) identifier (ID), a SCEF Reference ID and a mobile management node ID. A monitoring event configuration related to a terminal device is identified by the SCEF ID, the SCEF Reference ID and the mobile management node ID.

In an embodiment, during a mobility procedure of the terminal device moving from the third mobile management function to another mobile management function, the inform IWK-SCEF message further comprises a deletion notification of the monitoring event configuration related to the terminal device and the handling the inform IWK-SCEF message comprises deleting the monitoring event configuration related to the terminal device.

In a fifth aspect of the disclosure, there is provided a first mobile management node. The first mobile management node comprises a processor and a memory coupled to the processor. Said memory contains instructions executable by said processor. Said first mobile management node is operative to receive information regarding a first interworking service capability exposure function (IWK-SCEF) from a second mobile management node. Said first mobile management node is further operative to determine whether the first mobile management node and the second mobile management node use a same IWK-SCEF based on the information regarding the first IWK-SCEF. Said first mobile management node is further operative to send an indication of whether the first mobile management node and the second mobile management node use the same IWK-SCEF to the second mobile management node.

In a sixth aspect of the disclosure, there is provided a second mobile management node. The second mobile management node comprises a processor and a memory coupled to the processor. Said memory contains instructions executable by said processor. Said second mobile management node is operative to send information regarding a first interworking service capability exposure function (IWK-SCEF) to a first mobile management node. Said second mobile management node is further operative to receive an indication of whether the first mobile management node and the second mobile management node use the same IWK-SCEF from the first mobile management node. The information regarding the first IWK-SCEF is used to determine whether the first mobile management node and the second mobile management node use a same IWK-SCEF.

In a seventh aspect of the disclosure, there is provided a third mobile management node. The third mobile management node comprises a processor and a memory coupled to the processor. Said memory contains instructions executable by said processor. Said third mobile management node is operative to send an inform interworking service capability exposure function (IWK-SCEF) message to an IWK-SCEF. The inform IWK-SCEF message comprises a service capability exposure function (SCEF) identifier (ID), a SCEF Reference ID and a mobile management node ID. A monitoring event configuration is identified by the SCEF ID, the SCEF Reference ID and the mobile management node ID.

In an eighth aspect of the disclosure, there is provided an interworking service capability exposure function (IWK-SCEF). The IWK-SCEF comprises a processor and a memory coupled to the processor. Said memory containing instructions executable by said processor. Said IWK-SCEF is operative to receive an inform IWK-SCEF message from a third mobile management node. Said IWK-SCEF is further operative to handle the inform IWK-SCEF message. The inform IWK-SCEF message comprises a service capability exposure function (SCEF) identifier (ID), a SCEF Reference ID and a mobile management node ID. A monitoring event configuration is identified by the SCEF ID, the SCEF Reference ID and the mobile management node ID.

In a ninth aspect of the disclosure, there is provided a computer-readable storage medium storing instructions which when executed by at least one processor, cause the at least one processor to perform the method according to any one of the first, second, third and fourth aspects.

In a tenth aspect of the disclosure, there is provided a computer program product comprising instructions which when executed by at least one processor, cause the at least one processor to perform the method according to any one of the first, second, third and fourth aspects.

Embodiments herein offer many advantages, of which a non-exhaustive list of examples follows. Some embodiments herein proposes an enhancement mechanism for MEC update in Inter-node mobility procedures. Some embodiments herein may use existing signaling (messages), no extra messages are introduced. Some embodiments herein may avoid useless data accumulated on the IWK-SCEF node. Some embodiments herein may ensure that MEC can be correctly updated and avoid unexpected MEC deletion on the IWK-SCEF in Inter-node mobility procedures. Some embodiments herein may simplify the signaling interaction and save the signaling interaction between an old mobile management node (such as SGSN/MME) and an old IWK-SCEF when a new mobile management node (such as SGSN/MME) and the old mobile management node are using the same IWK-SCEF. Some embodiments herein may save the resource of IWK-SCEF since IWK-SCEF does not need to maintain two different monitoring event configurations in the Inter-node mobility procedures and IWK-SCEF can keep original handling mechanism unchanged. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 2 shows a flowchart of monitoring event configuration and deletion via HSS procedure according to an embodiment of the present disclosure;

FIG. 3 shows a flowchart of a method according to an embodiment of the present disclosure;

FIG. 4 shows a flowchart of a method according to another embodiment of the present disclosure;

FIG. 5 shows a flowchart of a method according to another embodiment of the present disclosure;

FIG. 6 shows a flowchart of a method according to another embodiment of the present disclosure;

FIG. 7 shows a flowchart of a method according to another embodiment of the present disclosure;

FIG. 9 shows a flowchart of a method according to another embodiment of the present disclosure;

FIG. 10 shows a flowchart of a method according to another embodiment of the present disclosure;

DETAILED DESCRIPTION

Figure 1A:
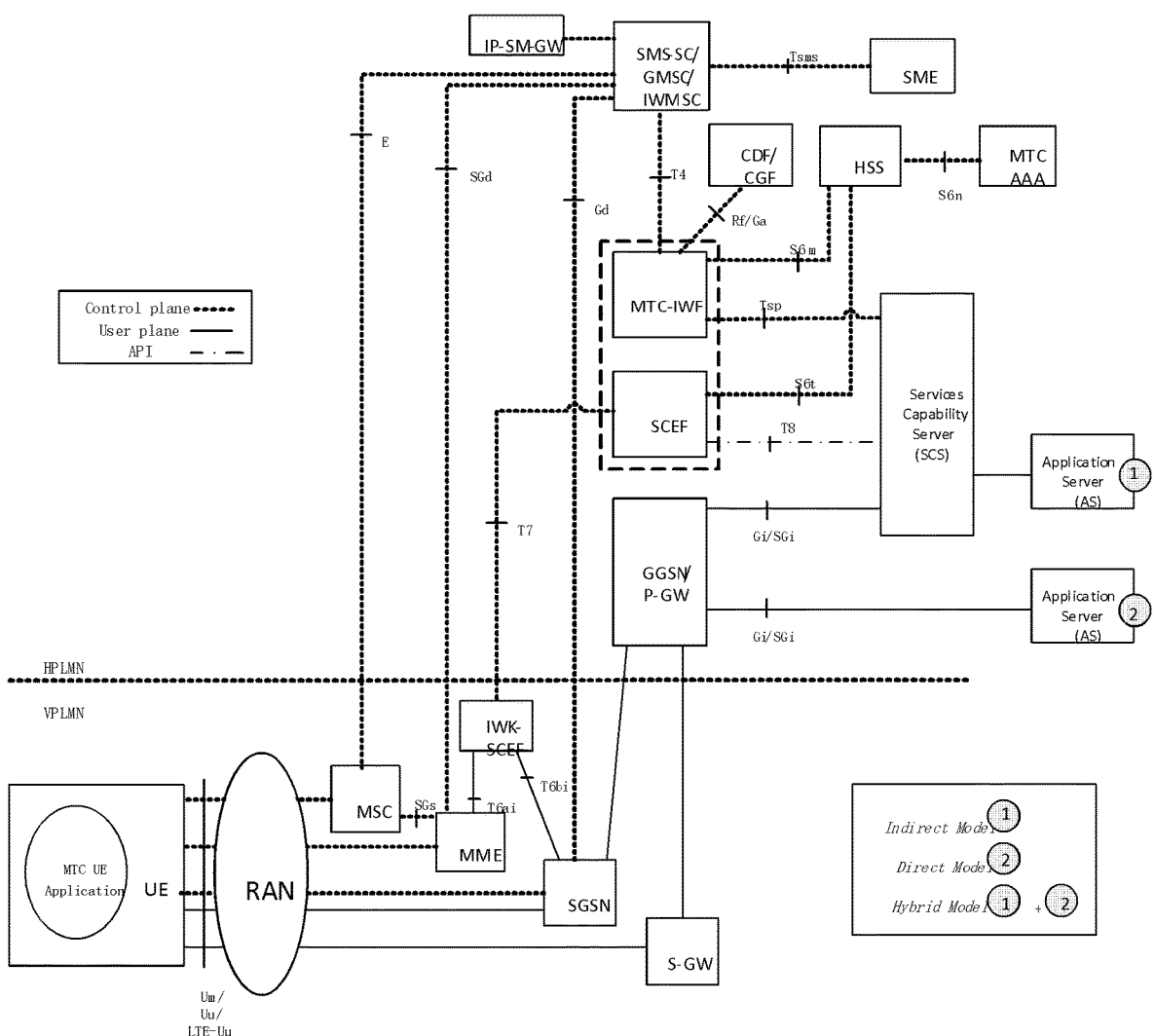
FIG. 1a schematically shows a system architecture in a 4G network.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols as may comprise the first generation (1G), 2G, 3G, 4G, 4.5G, 5G communication protocols, and/or any other protocols either currently known or to be developed in the future.

The term "network function (NF)" refers to any suitable function which can be implemented in a network entity or node (physical or virtual) of a communication network. For example, a network function can be implemented either as a network element on a dedicated hardware, as a software instance running on a dedicated hardware, or as a virtualized function instantiated on an appropriate platform, e.g. on a cloud infrastructure. For example, the 4G system (such as LTE) may include MME, HSS (home subscriber server), SCEF, Services Capability Server (SCS), Application Server (AS), RAN(Radio Access Network), SGSN, MSC (Mobile Switching Centre), etc. In other embodiments, the network function may comprise different types of NFs for example depending on a specific network.

The term "network node" refers to an access network node or a core network node. The core network node may be a network's core part, which may offer numerous services to the customers who are interconnected by the access network node. The access network node may enable a terminal device to access to the network and receives services therefrom.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB (Universal Serial Bus) dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrases "at least one of A or B" and "at least one of A and B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to the cellular network as defined by 3GPP being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies such as wireless sensor network may equally be utilized as long as exemplary embodiments described herein are applicable.

Figure 1B:
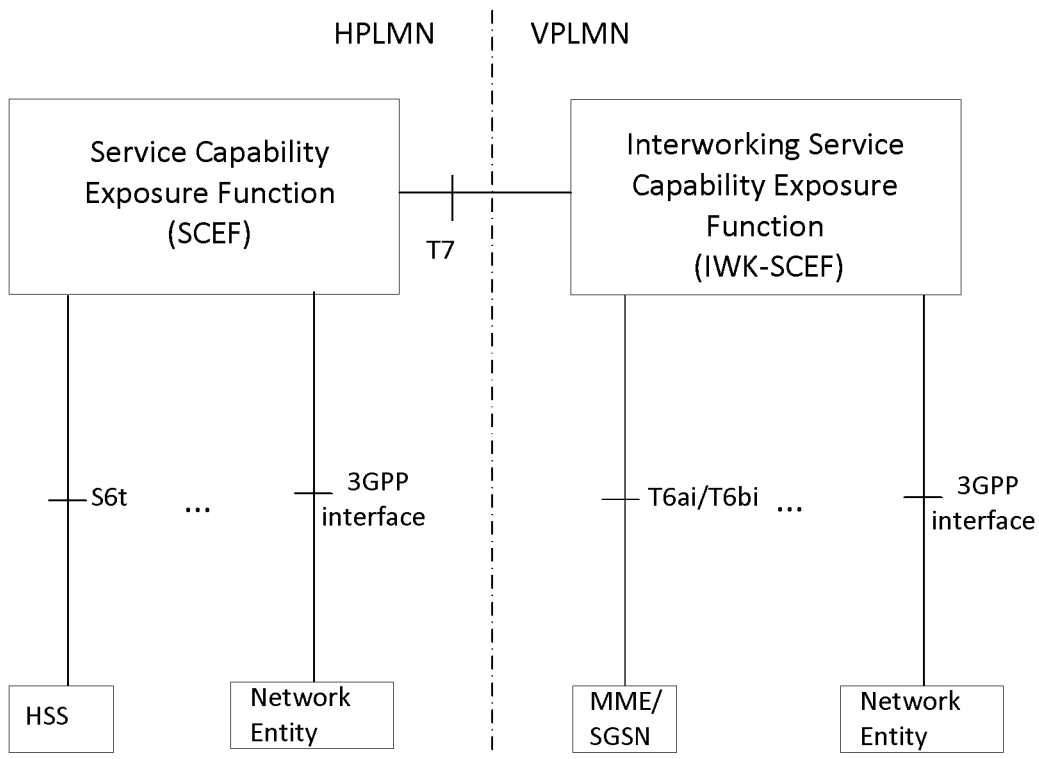
FIG. 1b schematically shows 3GPP roaming architecture for service capability exposure.

FIGS. 1a-1b show some system architectures in which the embodiments of the present disclosure can be implemented. For simplicity, the system architectures of FIGS. 1a-1b only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 1a schematically shows a system architecture in a 4G network, which is same as FIG. 4.2-1b of 3GPP TS 23.682 V16.8.0. The system architecture of FIG. 1a may comprise some exemplary elements such as Services Capability Server (SCS), Application Server (AS), SCEF, IWK-SCEF, HSS, UE, RAN (Radio Access Network), SGSN (Serving GPRS (General Packet Radio Service) Support Node), MME, MSC (Mobile Switching Centre), S-GW (Serving Gateway), GGSN/P-GW (Gateway GPRS Support Node/PDN (Packet Data Network) Gateway), MTC-IWF (Machine Type Communications-InterWorking Function) CDF/CGF (Charging Data Function/Charging Gateway Function), MTC-AAA (Machine Type Communications-authentication, authorization and accounting), SMS-SC/GMSC/IWMSC (Short Message Service-Service Centre/Gateway MSC/InterWorking MSC) IP-SM-GW (Internet protocol Short Message Gateway). The network elements and interfaces as shown in FIG. 1a may be same as the corresponding network elements and interfaces as described in 3GPP TS 23.682 V16.8.0.

FIG. 1b schematically shows 3GPP roaming architecture for service capability exposure, which is same as FIGS. 4.2-3 of 3GPP TS 23.682 V16.8.0. The IWK-SCEF is optional. When deployed, the IWK-SCEF may be located in the VPLMN.

FIG. 2 shows a flowchart of monitoring event configuration and deletion via HSS procedure according to an embodiment of the present disclosure. The flowchart of FIG. 2 is same as FIG. 5.6.6.1-1 of 3GPP TS 23.682 V16.8.0.

At step 10, MME/SGSN may send an Inform IWK-SCEF (Monitoring Type, SCEF SCEF Reference ID, Maximum Number of Reports, Monitoring Duration, SCEF Reference ID for Deletion, Chargeable Party Identifier, Monitoring Event Report) message to the IWK-SCEF.

At step 11, the IWK-SCEF may authorize the request, e.g. if the Monitoring Type is covered by a roaming agreement and notes the SCEF Reference ID for Deletion if available. If this authorization fails the IWK-SCEF follows step 12 and provides a Cause value indicating the reason for the failure condition to the MME/SGSN. Based on operator policies, the IWK-SCEF may also reject the request due to other reasons (e.g. overload or MME/SGSN has exceeded its quota or rate of submitting monitoring requests defined by an SLA).

If the request indicates deletion of a Monitoring Event Request, the IWK-SCEF shall perform any final operations necessary, e.g. generation of final charging information, delete any stored parameters, and send an acknowledgement to the MME/SGSN in step 12.

If the request indicates continuous reporting (new or a modification), the IWK-SCEF may authorize the request and, if authorization is successful, stores the received parameters, sends an acknowledgement to the MME/SGSN in step 12, and starts to watch for the indicated Monitoring Event (s).

If the request indicates One-time reporting, then the IWK-SCEF may authorize the request and, if authorization is successful, may perform normalization of the data according to operator policies, and sends an acknowledgement to the MME/SGSN in step 12 that contains any such normalized data.

If the request included Monitoring Event Data then the IWK-SCEF may perform normalization of the data according to operator policies.

At step 12, if the authorization is successful, the IWK-SCEF sends an Authorization from IWK-SCEF (Cause, Monitoring Event Report) message to MME/SGSN.

The Monitoring Event Report is included if it was a One-time request, the MME/SGSN provided the Monitoring Event Report in the Inform IWK-SCEF message and the IWK-SCEF is not reporting directly to the SCEF.

FIG. 3 shows a flowchart of a method according to an embodiment of the present disclosure, which may be performed by an apparatus implemented in or at or as a first mobile management node or communicatively coupled to the first mobile management node. As such, the apparatus may provide means or modules for accomplishing various parts of the method 300 as well as means or modules for accomplishing other processes in conjunction with other components. The first mobile management node may be any suitable network node which can implement mobile management function. In an embodiment, the first mobile management node may comprise SGSN or MME as shown in FIGS. 1a and 1b.

At block 302, the first mobile management node may receive information regarding a first IWK-SCEF from a second mobile management node. The second mobile management node may be any suitable network node which can implement mobile management function. In an embodiment, the second mobile management node may comprise SGSN or MME as shown in FIGS. 1a and 1b.

At block 304, the first mobile management node may determine whether the first mobile management node and the second mobile management node use a same IWK-SCEF based on the information regarding the first IWK-SCEF.

The information regarding a first IWK-SCEF may comprise any suitable information regarding the first IWK-SCEF.

As a first example, the information regarding the first IWK-SCEF may comprise identification (ID) information of the first IWK-SCEF. The ID information of the first IWK-SCEF may be any suitable information which can uniquely identify the first IWK-SCEF. In an embodiment, when the second mobile management node uses the first IWK-SCEF, the information regarding the first IWK-SCEF may comprise the Diameter HOST and REALM information of the first IWK-SCEF. The Diameter HOST and REALM information of the first IWK-SCEF may be used to uniquely identify the first IWK-SCEF. The Diameter HOST and REALM information has been described in RFC (Request for Comments) 3588, Diameter Based Protocol, September 2003, the disclosure of which is incorporated by reference herein in its entirety.

As a second example, the information regarding the first IWK-SCEF may comprise information indicating that the second mobile management node does not use the first IWK-SCEF or does not use any IWK-SCEF.

The first mobile management node may receive the information regarding the first IWK-SCEF from the second mobile management node in various ways. For example, during a terminal device moving from the first mobile management function to the second mobile management function, the first mobile management node may receive the information regarding the first IWK-SCEF from the second mobile management node. In another example, during a terminal device moving from the second mobile management function to the first mobile management function, the first mobile management node may receive the information regarding the first IWK-SCEF from the second mobile management node.

In an embodiment, blocks 302 and 304 may be performed during a mobility procedure of a terminal device moving from the first mobile management function to the second mobile management function.

In an embodiment, the mobility procedure comprises at least one of a tracking area update procedure or a handover procedure.

The terminal device may move from the first mobile management function to the second mobile management function due to various reasons. In an embodiment, the terminal device may move from the first mobile management function to the second mobile management function in a tracking area update procedure or a handover procedure. For example, the tracking area update procedure may be same as the Tracking Area Update procedures as described in clause 5.3.3 of 3GPP TS 23.401 V16.8.0, the disclosure of which is incorporated by reference herein in its entirety. The handover procedure may be same as the S1-based handover as described in clause 5.5.1.2 of 3GPP TS 23.401 V16.8.0 or Inter RAT handover as described in clause 5.5.2 of 3GPP TS 23.401 V16.8.0.

In an embodiment, blocks 302 and 304 may be performed during a mobility procedure of a terminal device moving from the second mobile management function to the first mobile management function.

The terminal device may move from the second mobile management function to the first mobile management function due to various reasons. In an embodiment, the terminal device may move from the second mobile management function to the first mobile management function in a tracking area update procedure or a handover procedure. For example, the tracking area update procedure may be same as the Tracking Area Update procedures as described in clause 5.3.3 of 3GPP TS 23.401 V16.8.0, the disclosure of which is incorporated by reference herein in its entirety. The handover procedure may be same as the S1-based handover as described in clause 5.5.1.2 of 3GPP TS 23.401 V16.8.0 or Inter RAT handover as described in clause 5.5.2 of 3GPP TS 23.401 V16.8.0.

The information regarding the first IWK-SCEF may be comprised in any suitable message. In an embodiment, during a mobility procedure of a terminal device moving from the first mobile management function to the second mobile management function, the information regarding the first IWK-SCEF may be comprised in at least one of a Context Request; a Context Acknowledge message; a Forward Relocation Response; or a Forward Relocation Complete Notification message as described in 3GPP TS 23.401 V16.8.0. In another embodiment, during a mobility procedure of a terminal device moving from the second mobile management function to the first mobile management function, the information regarding the first IWK-SCEF may be comprised in at least one of a Context Response or a Forward Relocation Request as described in 3GPP TS 23.401 V16.8.0.

In an embodiment, determining whether the first mobile management node and the second mobile management node use the same IWK-SCEF based on the information regarding the first IWK-SCEF may comprise:

when the first mobile management node uses the first IWK-SCEF and the information regarding the first IWK-SCEF indicates that the second mobile management node uses the first IWK-SCEF, determining that the first mobile management node and the second mobile management node use the same IWK-SCEF;

when the first mobile management node uses another IWK-SCEF and the information regarding the first IWK-SCEF indicates that the second mobile management node uses the first IWK-SCEF, determining that the first mobile management node and the second mobile management node do not use the same IWK-SCEF; or when the first mobile management node uses the first IWK-SCEF and the information regarding the first IWK-SCEF indicates that the second mobile management node does not use any IWK-SCEF, determining that the first mobile management node and the second mobile management node do not use the same IWK-SCEF.

FIG. 4 shows a flowchart of a method according to another embodiment of the present disclosure, which may be performed by an apparatus implemented in or at or as a first mobile management node or communicatively coupled to the first mobile management node. As such, the apparatus may provide means or modules for accomplishing various parts of the method 400 as well as means or modules for accomplishing other processes in conjunction with other components. For some parts which have been described in the above embodiments, the description thereof is omitted here for brevity. In this embodiment, the method 400 may be performed during a mobility procedure of a terminal device moving from the first mobile management function to the second mobile management function. Blocks 402 and 404 are same as blocks 302 and 304 of FIG. 3 respectively.

At block 402, the first mobile management node may receive information regarding a first IWK-SCEF from a second mobile management node.

At block 404, the first mobile management node may determine whether the first mobile management node and the second mobile management node use a same IWK-SCEF based on the information regarding the first IWK-SCEF.

At block 406, in response to a determination that the first mobile management node and the second mobile management node use the same IWK-SCEF, the first mobile management node may skip sending a deletion notification of a monitoring event configuration related to the terminal device to the same IWK-SCEF.

At block 408, in response to a determination that the first mobile management node and the second mobile management node do not use the same IWK-SCEF, the first mobile management node may send the deletion notification of the monitoring event configuration related to the terminal device to the IWK-SCEF used by the first mobile management node.

The deletion notification of the monitoring event configuration may be comprised in any suitable message. In an embodiment, the deletion notification of the monitoring event configuration may be comprised in an inform IWK-SCEF message as described in clause 5.6.6 of 3GPP TS 23.682 V16.8.0. For example, the deletion notification of the monitoring event configuration may be SCEF Reference ID for Deletion as described in clause 5.6.0 of 3GPP TS 23.682 V16.8.0.

FIG. 5 shows a flowchart of a method according to another embodiment of the present disclosure, which may be performed by an apparatus implemented in or at or as a first mobile management node or communicatively coupled to the first mobile management node. As such, the apparatus may provide means or modules for accomplishing various parts of the method 500 as well as means or modules for accomplishing other processes in conjunction with other components. For some parts which have been described in the above embodiments, the description thereof is omitted here for brevity. In this embodiment, the method 500 may be performed during a mobility procedure of a terminal device moving from the second mobile management function to the first mobile management function. Blocks 502 and 506 are same as blocks 302 and 304 of FIG. 3 respectively.

At block 502, the first mobile management node may receive information regarding a first IWK-SCEF from a second mobile management node.

At block 504, the first mobile management node may select an IWK-SCEF based on the information regarding the first IWK-SCEF. The information regarding the first IWK-SCEF may be used as a (optional) selection parameter in the IWK-SCEF selection. The first mobile management node may select a same or different IWK-SCEF based on the information regarding the first IWK-SCEF. For example, when the first IWK-SCEF is a candidate IWK-SCEF that can be selected in the IWK-SCEF selection, the first mobile management node may select the first IWK-SCEF. Otherwise, the first mobile management node may select another first IWK-SCEF different from the first IWK-SCEF. Alternatively, the first mobile management node may not select any IWK-SCEF.

In an embodiment, the first mobile management node may select the same IWK-SCEF as the IWK-SCEF used by the second mobile management node.

At block 506, the first mobile management node may determine whether the first mobile management node and the second mobile management node use a same IWK-SCEF based on the information regarding the first IWK-SCEF.

At block 508, the first mobile management node may send an indication of whether the first mobile management node and the second mobile management node use the same IWK-SCEF to the second mobile management node.

The indication may be comprised in any suitable message such as a new message or an existing message. In an embodiment, the indication may be comprised in at least one of Context Acknowledge message; Forward Relocation Response; or Forward Relocation Complete Notification message as described in 3GPP TS 23.401 V16.8.0.

In an embodiment, the indication may be a new Indication flag bit "IWK-SCEF Change Indication" that can be introduced in an legacy indication IE (information element) of the messages from the first mobile management node such as new SGSN/MME node to the second mobile management node such as old SGSN/MME node, to notify the second mobile management node whether the IWK-SCEF node is changed in the mobility procedure.

FIG. 6 shows a flowchart of a method according to another embodiment of the present disclosure, which may be performed by an apparatus implemented in or at or as a second mobile management node or communicatively coupled to the second mobile management node. As such, the apparatus may provide means or modules for accomplishing various parts of the method 600 as well as means or modules for accomplishing other processes in conjunction with other components. For some parts which have been described in the above embodiments, the description thereof is omitted here for brevity. The second mobile management node may be any suitable network node which can implement mobile management function. In an embodiment, the second mobile management node may comprise SGSN or MME as shown in FIGS. 1a and 1b.

At block 602, the second mobile management node may send information regarding a first IWK-SCEF to a first mobile management node. The information regarding the first IWK-SCEF may be used to determine whether the first mobile management node and the second mobile management node use a same IWK-SCEF.

The second mobile management node may send the information regarding the first IWK-SCEF to the first mobile management node in various ways. In an embodiment, during a mobility procedure of a terminal device moving from the first mobile management function to the second mobile management function, the second mobile management node may send the information regarding the first IWK-SCEF to the first mobile management node. In another embodiment, during a mobility procedure of a terminal device moving from the first mobile management function to the second mobile management function, the second mobile management node may send the information regarding the first IWK-SCEF to the first mobile management node.

FIG. 7 shows a flowchart of a method according to another embodiment of the present disclosure, which may be performed by an apparatus implemented in or at or as a second mobile management node or communicatively coupled to the second mobile management node. As such, the apparatus may provide means or modules for accomplishing various parts of the method 700 as well as means or modules for accomplishing other processes in conjunction with other components. For some parts which have been described in the above embodiments, the description thereof is omitted here for brevity. In this embodiment, the method 700 may be performed during a mobility procedure of a terminal device moving from the second mobile management function to the first mobile management function.

At block 702, the second mobile management node may send information regarding a first IWK-SCEF to a first mobile management node. Block 702 is same as block 602 of FIG. 6.

As described above, the first mobile management node may select an IWK-SCEF based on the information regarding the first IWK-SCEF at block 504 of FIG. 5, determine whether the first mobile management node and the second mobile management node use a same IWK-SCEF based on the information regarding the first IWK-SCEF at block 506 of FIG. 5, and send an indication of whether the first mobile management node and the second mobile management node use the same IWK-SCEF to the second mobile management node at block 508 of FIG. 5.

At block 704, the second mobile management node may receive the indication of whether the first mobile management node and the second mobile management node use the same IWK-SCEF from the first mobile management node.

At block 706, in response to the first mobile management node and the second mobile management node use the same IWK-SCEF, the second mobile management node may skip sending a deletion notification of a monitoring event configuration related to the terminal device to the same IWK-SCEF.

At block 708, in response to the first mobile management node and the second mobile management node does not use the same IWK-SCEF, the second mobile management node may send the deletion notification of the monitoring event configuration related to the terminal device to the IWK-SCEF used by the second mobile management node.

In an embodiment, the deletion notification of the monitoring event configuration may be comprised in an inform IWK-SCEF message.

Figure 8:
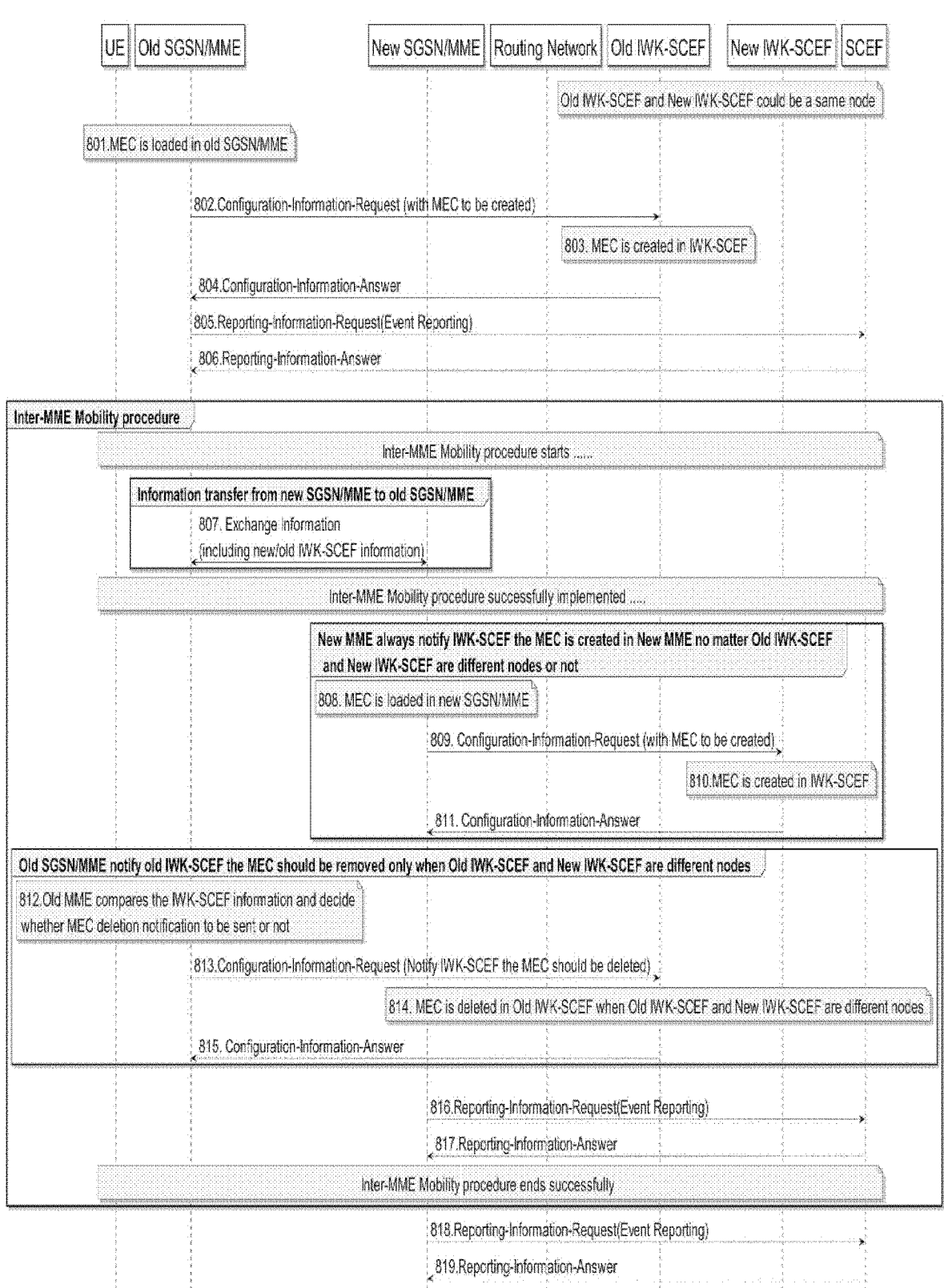
FIG. 8 shows a flowchart of a method according to another embodiment of the present disclosure.

FIG. 8 shows a flowchart of a method according to another embodiment of the present disclosure. It is noted that Old IWK-SCEF and New IWK-SCEF could be a same node or different node.

At step 801, MEC is loaded in the old SGSN/MME node.

At step 802, the old SGSN/MME may send a Configuration-Information-Request (with MEC to be created) to its IWK-SCEF (e.g., old IWK-SCEF).

At step 803, the old IWK-SCEF may save the MEC and create MEC in the old IWK-SCEF.

At step 804, the old IWK-SCEF may send Configuration-Information-Answer to the old SGSN/MME.

At step 805, the old IWK-SCEF may send Reporting-Information-Request (Event Reporting) to SCEF.

At step 806, SCEF may send Reporting-Information-Answer to the old IWK-SCEF.

Inter-node mobility procedure may start. During the Inter-node mobility procedure, there are legacy messages that may be exchanged between the new SGSN/MME node and the old SGSN/MME node as described in 3GPP TS 23.401 V16.8.0.

At step 807, information may be exchanged between the old SGSN/MME and the new SGSN/MME. For example, a sending SGSN/MME may include a new IWK-SCEF-ID IE in a corresponding message. Using the IWK-SCEF-ID IE, a receiving SGSN/MME can deduce whether they are using the same IWK-SCEF node.

Choice 1: the new SGSN/MME node may provide its IWK-SCEF information to the old SGSN/MME and the old SGSN/MME is responsible to deduce or determine whether they are using the same IWK-SCEF node.

For Tracking Area Update procedure, the Context Request or Context Acknowledge message can be used by the new SGSN/MME node to deliver the IWK-SCEF information.

For Handover procedure, the Forward Relocation Response or Forward Relocation Complete Notification message can be used by the new SGSN/MME node to deliver the IWK-SCEF information.

A new "IWK-SCEF-ID" IE may be introduced in the message exchanged between the new SGSN/MME node and the old SGSN/MME node. The "IWK-SCEF-ID" IE could include the Diameter HOST and REALM information of the IWK-SCEF.

Old SGSN/MME node is responsible to compare the IWK-SCEF-ID information with the IWK-SCEF that it is using to decide or determine whether it's the same IWK-SCEF node.

Choice 2: Old SGSN/MME node may provide its IWK-SCEF information to the new SGSN/MME and the new SGSN/MME is responsible to deduce or determine whether they are using the same IWK-SCEF node. And the new SGSN/MME should notify the old SGSN/MME the result.

For Tracking Area Update procedure, the Context Response message can be used by the old SGSN/MME node to deliver the IWK-SCEF information. The Context Acknowledge message can be used by new SGSN/MME node to notify old SGSN/MME node whether they are using the same IWK-SCEF node.

For Handover procedure, the Forward Relocation Request message can be used by the old SGSN/MME node to deliver the IWK-SCEF information. The Forward Relocation Response or Forward Relocation Complete Notification message can be used by the new SGSN/MME node to notify the old SGSN/MME node whether they are using the same IWK-SCEF node.

A new "IWK-SCEF-ID" IE may be introduced in the messages from the old SGSN/MME node to the new SGSN/MME node. The "IWK-SCEF-ID" IE may include the Diameter HOST and REALM information of the IWK-SCEF.

New SGSN/MME may use the IWK-SCEF-ID information provided by old SGSN/MME node as extra input in IWK-SCEF selection. And new SGSN/MME node is responsible to compare the IWK-SCEF-ID information provide by old SGSN/MME node with the IWK-SCEF that it chooses to decide or determine whether they are using the same IWK-SCEF node and notify old SGSN/MME the result.

A new Indication flag bit "IWK-SCEF Change Indication" can be introduce in legacy Indication IE of the messages from the new SGSN/MME node to the old SGSN/MME node, to notify the old SGSN/MME node whether the IWK-SCEF node is changed in the mobility procedure.

New SGSN/MME always notify IWK-SCEF the MEC is created in New MME no matter the old IWK-SCEF and the new IWK-SCEF are different nodes or not.

At step 808, MEC is loaded in the new SGSN/MME.

At step 809, the new SGSN/MME sends Configuration-Information-Request (with MEC to be created) to the new IWK-SCEF node.

At step 810, MEC is created in the new IWK-SCEF.

At step 811, the new IWK-SCEF sends Configuration-Information-Answer to the new SGSN/MME.

The new SGSN/MME node always send MEC to the new IWK-SCEF. If the new SGSN/MME node use a different IWK-SCEF node, the new IWK-SCEF will save the MEC as a new MEC. If new SGSN/MME node use the same IWK-SCEF node used by old SGSN/MME node, the new IWK-SCEF may use the MEC information provided by the new SGSN/MME node to update existing MEC since the SCEF-ID and SCEF-Reference-ID is identical with the MEC provided by old SGSN/MME node.

The old SGSN/MME node already knows whether the same IWK-SCEF is used by both old and new SGSN/MME nodes. If the same IWK-SCEF node is used by both old SGSN/MME node and new SGSN/MME node, the old SGSN MME should not send out MEC deletion notification to the old IWK-SCEF. It can save the extra interaction with the old IWK-SCEF and can avoid the old IWK-SCEF wrongly deletes the MEC. If different IWK-SCEF nodes are used by old SGSN/MME node and new SGSN/MME node, old SGSN/MME should send out MEC deletion notification to its IWK-SCEF for example before old SGSN/MME deletes the MEC locally. It can avoid outdated MEC data hung on the old IWK-SCEF node.

At step 812, the old SGSN/MME node compares the IWK-SCEF information and decide whether MEC deletion notification should be sent or not.

At step 813, when deciding that the MEC deletion notification should be sent to the old IWK-SCEF, the old SGSN/MME node sends Configuration-Information-Request that notifies the old IWK-SCEF that the MEC should be deleted.

At step 814, MEC is deleted in old IWK-SCEF when old IWK-SCEF and new IWK-SCEF are different nodes At step 815, the old IWK-SCEF sends Configuration-Information-Answer to the old SGSN/MME node.

The steps handled by different SGSN/MME nodes may be performed independently since they are handled by different SGSN/MME nodes.

The MEC handling logic in IWK-SCEF needn't be changed.

At step 816, the new SGSN/MME node may send Reporting-Information-Request (Event Reporting) to the SCEF At step 817, the SCEF may send Reporting-Information-Answer to the new SGSN/MME node At step 818, the new SGSN/MME node may send another Reporting-Information-Request (Event Reporting) to the SCEF At step 819, the SCEF may send another Reporting-Information-Answer to the new SGSN/MME node.

The reporting procedure of steps 816-819 may be same as the reporting procedure as described in clause 5.6.8.1 of 3GPP TS 23.682 V16.8.0.

FIG. 9 shows a flowchart of a method according to another embodiment of the present disclosure, which may be performed by an apparatus implemented in or at or as a third mobile management node or communicatively coupled to the third mobile management node. As such, the apparatus may provide means or modules for accomplishing various parts of the method 900 as well as means or modules for accomplishing other processes in conjunction with other components. The third mobile management node may be any suitable network node which can implement mobile management function. In an embodiment, the third mobile management node may comprise SGSN or MME as shown in FIGS. 1a and 1b.

At block 902, the third mobile management node may send an inform interworking service capability exposure function (IWK-SCEF) message to an IWK-SCEF. The inform IWK-SCEF message may comprise a service capability exposure function (SCEF) identifier (ID), a SCEF Reference ID and a mobile management node ID. A monitoring event configuration related to a terminal device may be identified by the SCEF ID, the SCEF Reference ID and the mobile management node ID. The SCEF ID and the SCEF Reference ID may be same as the corresponding terms as described in clause 5.6.0 of 3GPP TS 23.682 V16.8.0.

In an embodiment, the inform IWK-SCEF message may be the inform IWK-SCEF message as described in clause 5.6.6.1 of 3GPP TS 23.682 V16.8.0 except that it further comprises the mobile management node ID.

The mobile management node ID may be any suitable identifier which can uniquely identify the third mobile management node. In an embodiment, the third mobile management node ID comprises at least one of Origin-Host and Origin-Realm or Fully Qualified Domain Name. The Origin-Host and Origin-Realm has been described in RFC 3588.

In an embodiment, during a mobility procedure of the terminal device moving from the third mobile management function to another mobile management function, the inform IWK-SCEF message may further comprise a deletion notification of the monitoring event configuration related to the terminal device. For example, the deletion notification may be SCEF Reference ID for Deletion as described in clause 5.6.0 of 3GPP TS 23.682 V16.8.0.

FIG. 10 shows a flowchart of a method according to another embodiment of the present disclosure, which may be performed by an apparatus implemented in or at or as an IWK-SCEF or communicatively coupled to the IWK-SCEF. As such, the apparatus may provide means or modules for accomplishing various parts of the method 1000 as well as means or modules for accomplishing other processes in conjunction with other components. For some parts which have been described in the above embodiments, the description thereof is omitted here for brevity. In an embodiment, the IWK-SCEF may be the IWK-SCEF as shown in FIGS. 1a and 1b.

At block 1002, the IWK-SCEF may receive an inform IWK-SCEF message from a third mobile management node. The inform IWK-SCEF message may comprise a service capability exposure function (SCEF) identifier (ID), a SCEF Reference ID and a mobile management node ID. A monitoring event configuration related to a terminal device may be identified by the SCEF ID, the SCEF Reference ID and the mobile management node ID. For example, the third mobile management node may send an inform IWK-SCEF message to the IWK-SCEF at block 902, and then the IWK-SCEF may receive the inform IWK-SCEF message from the third mobile management node.

At block 1004, the IWK-SCEF may handle the inform IWK-SCEF message. For example, the IWK-SCEF may handle the inform IWK-SCEF message as described in clause 5.6.6.1 of 3GPP TS 23.682 V16.8.0. In addition, the IWK-SCEF may save the MEC with a new MEC identification logic. For example, the IWK-SCEF may use the mobile management node ID together with SCEF-ID and SCEF-Reference-ID information to uniquely identify the MEC. With the new MEC identification logic, the IWK-SCEF may save the MEC as a new MEC no matter the another mobile management node (e.g., old SGSN/MME) is also connected to this IWK-SCEF or not. Since IWK-SCEF may use the mobile management node ID together with SCEF-ID and SCEF-Reference-ID information to uniquely identify MEC, even another MEC with the same SCEF-ID and SCEF-Reference-ID but different mobile management node ID already exists in the same IWK-SCEF node, the two MECs may be treated as two independent MECs.

In an embodiment, during a mobility procedure of the terminal device moving from the third mobile management function to another mobile management function, the inform IWK-SCEF message may further comprise a deletion notification of the monitoring event configuration related to the terminal device. For example, the IWK-SCEF may perform any final operations necessary, e.g. generation of final charging information, delete any stored parameters of the monitoring event configuration.

In an embodiment, the inform IWK-SCEF message further comprises a deletion notification of the monitoring event configuration related to the terminal device and the handling the inform IWK-SCEF message may comprise deleting the monitoring event configuration related to the terminal device.

The MEC related to the terminal device created by said another mobile management function may not be impacted even it is also exist in the same IWK-SCEF node since the MEC related to the terminal device is identified by the SCEF ID, the SCEF Reference ID and the mobile management node ID.

Figure 11:
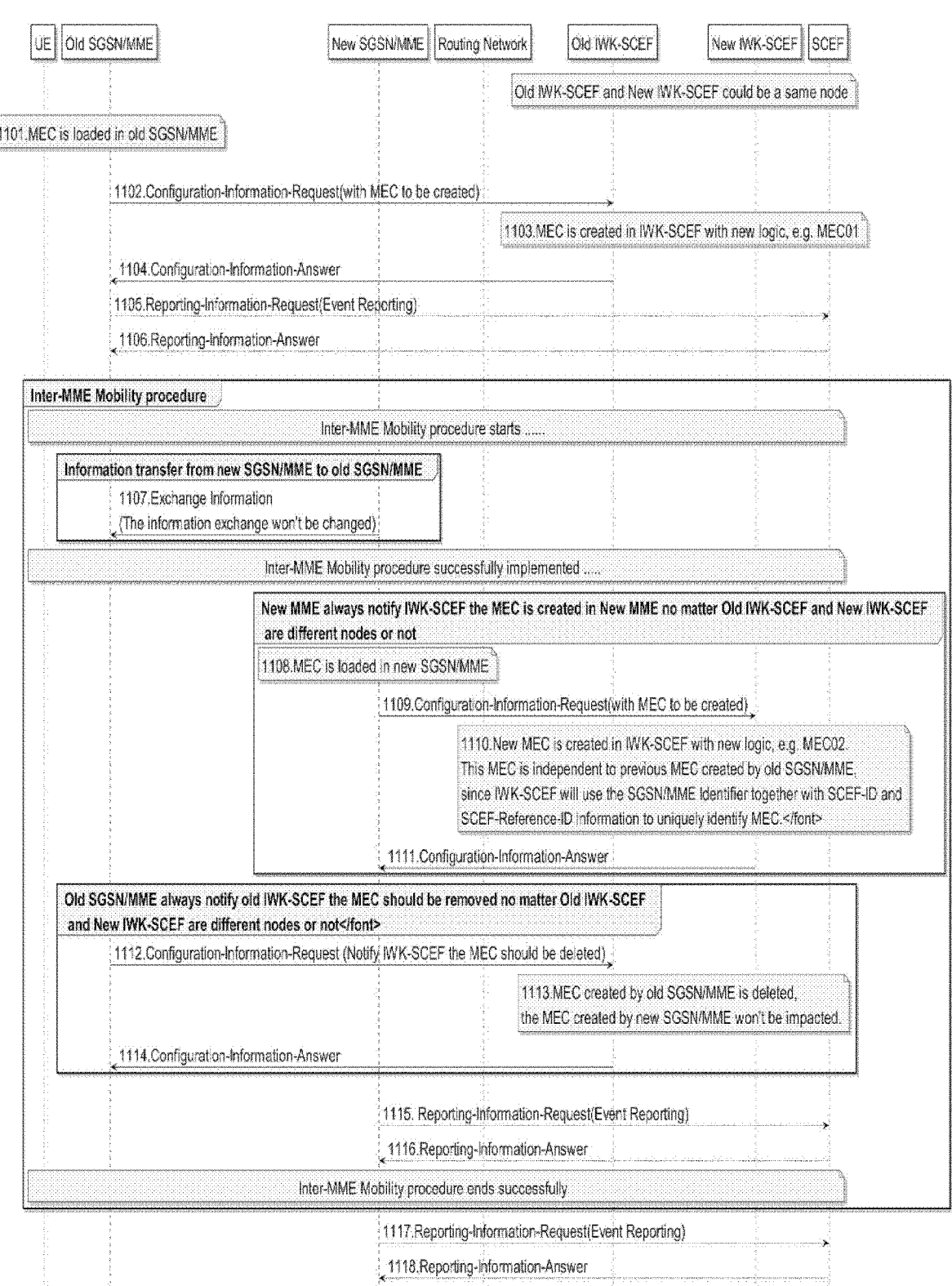
FIG. 11 shows a flowchart of a method according to another embodiment of the present disclosure.

FIG. 11 shows a flowchart of a method according to another embodiment of the present disclosure. It is noted that Old IWK-SCEF and New IWK-SCEF could be a same node or different node.

At step 1101, MEC is loaded in the old SGSN/MME node.

At step 1102, the old SGSN/MME may send a Configuration-Information-Request (with MEC to be created) to its IWK-SCEF (e.g., old IWK-SCEF). The Configuration-Information-Request comprises a service capability exposure function (SCEF) identifier (ID), a SCEF Reference ID and a mobile management node ID.

At step 1103, the old IWK-SCEF may save the MEC with a new MEC identification logic and create MEC in the old IWK-SCEF. A monitoring event configuration related to a terminal device is identified by the SCEF ID, the SCEF Reference ID and the mobile management node ID. The old IWK-SCEF may use the unique SGSN/MME identifier together with SCEF-ID and SCEF-Reference-ID information to uniquely identify the MEC.

The "Origin-Host" and "Origin-Realm" included in the message can be used as SGSN/MME unique identifier. Alternatively, SGSN/MME node can send other SGSN/MME identifier (e.g. Fully Qualified Domain Name of SGSN/MME node) to IWK-SCEF in the message to avoid the "Origin-Host" and "Origin-Realm" can't uniquely identify SGSN/MME nodes (This could happens when Diameter Proxies are using topology hiding technique), but new AVP need to be defined in the message (e.g. SGSN-MME-FQDN AVP).

At step 1104, the old IWK-SCEF may send Configuration-Information-Answer to the old SGSN/MME.

At step 1105, the old IWK-SCEF may send Reporting-Information-Request (Event Reporting) to SCEF.

At step 1106, SCEF may send Reporting-Information-Answer to the old IWK-SCEF.

Inter-node mobility procedure may start. During the Inter-node mobility procedure, there are legacy messages that may be sent from the new SGSN/MME node to the old SGSN/MME node as described in 3GPP TS 23.401 V16.8.0. The interaction between old SGSN/MME and new SGSN/MME is kept unchanged.

At step 1107, information may be exchanged between the old SGSN/MME and the new SGSN/MME.

At step 1108, MEC is loaded in the new SGSN/MME.

At step 1109, the new SGSN/MME always sends Configuration-Information-Request (with MEC to be created) to the new IWK-SCEF node.

At step 1110, a new MEC is created in the new IWK-SCEF with a new logic, e.g. MEC02. This MEC is independent to previous MEC created by the old SGSN/MME since the new IWK-SCEF may use the SGSN/MME Identifier together with SCEF-ID and SCEF-Reference-ID information to uniquely identify the MEC. With the new MEC identification logic, the new IWK-SCEF may save the MEC as a new MEC no matter the old SGSN/MME is also connected to this IWK-SCEF or not. Since the new IWK-SCEF may use the SGSN/MME identifier together with SCEF-ID and SCEF-Reference-ID information to uniquely identify MEC, even another MEC with same SCEF-ID and SCEF-Reference-ID but different SGSN/MME identifier already exists in the same IWK-SCEF node, these two MECs will be treated as two independent MECs.

At step 1111, the new IWK-SCEF sends Configuration-Information-Answer to the new SGSN/MME.

Old SGSN/MME always notifies the old IWK-SCEF that the MEC should be removed no matter Old IWK-SCEF and New IWK-SCEF are different nodes or not.

At step 1112, the old SGSN/MME node always sends Configuration-Information-Request that notifies the old IWK-SCEF that the MEC should be deleted. For example, Old SGSN/MME node always sends out MEC deletion notification to its IWK-SCEF before old SGSN/MME delete the MEC locally.

At step 1113, MEC created by the old SGSN/MME is deleted and the MEC created by the new SGSN/MME won't be impacted. For example, after the new IWK-SCEF receives the notification, the new IWK-SCEF may delete the MEC identified by SCEF-ID, SCEF-Reference-ID and SGSN/MME identifier of the old SGSN/MME node. The MEC created by the new SGSN/MME node won't be impacted even it is also exist in the same IWK-SCEF node.

At step 1114, the old IWK-SCEF sends Configuration-Information-Answer to the old SGSN/MME node.

The steps handled by different SGSN/MME nodes may be handled independently since they are handled by different SGSN/MME nodes.

At step 1115, the new SGSN/MME node may send Reporting-Information-Request (Event Reporting) to the SCEF At step 1116, the SCEF may send Reporting-Information-Answer to the new SGSN/MME node At step 1117, the new SGSN/MME node may send another Reporting-Information-Request (Event Reporting) to the SCEF At step 1118, the SCEF may send another Reporting-Information-Answer to the new SGSN/MME node.

The reporting procedure of steps 815-818 may be same as the reporting procedure as described in clause 5.6.8.1 of 3GPP TS 23.682 V16.8.0.

According to some embodiments, a new AVP (Attribute-Value Pair) is introduced in the messages exchanged between the new SGSN/MME node and the old SGSN/MME node in Inter-nodes mobility procedures to provide IWK-SCEF information. During the Inter-nodes mobility procedures, a new IE can be introduced in existing messages enhanced between old SGSN/MME node and new SGSN/MME node. The IWK-SCEF information can be compared in SGSN/MME node. If the IWK-SCEF information is identical, the old SGSN/MME should not send out MEC deletion notification to its IWK-SCEF. If the IWK-SCEF information is different, the old SGSN/MME may send out MEC deletion notification to its IWK-SCEF.

According to some embodiments, IWK-SCEF node may use a new logic to distinguish MECs. For example, IWK-SCEF may use the SGSN/MME Identifier together with SCEF-ID and SCEF-Reference-ID information to uniquely identify MEC. During the Inter-nodes mobility procedures, old SGSN/MME always sends MEC deletion notification to its IWK-SCEF. Since the IWK-SCEF uses the SGSN/MME Identifier together with SCEF-ID and SCEF-Reference-ID information to uniquely identify MEC, IWK-SCEF may treat the MEC created by the new SGSN/MME and the MEC deleted by the old SGSN/MME as two different monitoring event configuration. The monitoring event reporting won't be impacted.

According to various embodiments, some messages as shown in FIGS. 3-11 are same as the corresponding messages as described in 3GPP TS 23.682 V16.8.0 and 3GPP TS 23.401 V16.8.0. Some messages exchanged between two mobile management nodes may comprise information regarding the IWK-SCEF. Some messages exchanged between two mobile management nodes may comprise an indication of whether the first mobile management node and the second mobile management node use the same IWK-SCEF. Some messages exchanged between a mobile management node and an IWK-SCEF may comprise mobile management node ID and a monitoring event configuration related to a terminal device is identified by the SCEF ID, the SCEF Reference ID and the mobile management node ID.

The various blocks/steps shown in FIGS. 3-11 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

During mobility procedure, when a UE moves from an old SGSN/MME to a new SGSN/MME, Monitoring Event Configurations may be loaded in the new SGSN/MME and removed from old SGSN/MME. In roaming scenario where IWK-SCEF is deployed, the Monitoring Event Configurations may be updated to an IWK-SCEF by the new SGSN/MME sending an authorization request with MECs to the IWK-SCEF, and the old SGSN/MME may remove the MECs from the original IWK-SCEF.

In race condition scenarios, the MECs on the IWK-SCEF may be incorrectly removed as a MEC is identified by SCEF-ID and SCEF-Reference-ID information as the unique key. Thus if a new SGSN/MME selects the same IWK-SCEF and update the MECs to it earlier than the old SGSN/MME removing the MECs from the IWK-SCEF, the IWK-SCEF may delete the MECs accordingly which are not expected.

According to various embodiments, there is provided two Options to resolve the problem:

1) differentiate the MECs with association of additional SGSN/MME IDs via Thai.

2) Exchange IWK-IWF SCEF ID between old SGSN/MME and new SGSN/MME, and the old SGSN/MME skips removing MECs when the same IWK-SCEF is selected.

Option 1) requires a change on Monitoring Event Configuration with a new SGSN/MME ID, and it impacts both SGSN/MME and IWK-SCEF for all normal MEC signaling. Option 2) only requires changes in SGSN/MME and impact only mobility related signaling.

In an embodiment, a new IE is introduced to carry the selected IWK-SCEF Identifier by source MME/SGSN in forward Relocation Request and Context Response. A SISSME (Same IWK-SCEF for Monitoring Event) indication flag is added in Forward Relocation Complete Notification and Context Acknowledge. A new indication Same IWK-SCEF for Monitoring Event (SISSME) is added. It is extended the Node Identifier IE for IWK-SCEF.

In an embodiment, 3GPP TS 29.274 V16.5.0, the disclosure of which is incorporated by reference herein in its entirety, may be amended as following.

Table 7.3.1-1 of 3GPP TS 29.274 V16.5.0 may add the following IE.

TABLE 7.3.1-1

| Information Elements in a Forward Relocation Request | | | | |
|---|---|---|---|---|
| Information elements | P | Condition/Comment | IE Type | Ins. |
| IWK SCEF ID for Monitoring Event | CO | This IE shall be included on the S3/S10 interface if the source MME/SGSN has selected the IWK-SCEF to relay Monitoring Events. | Node Identifier | 0 |

Table 7.3.3-1 of 3GPP TS 29.274 V16.5.0 may be amended as following.

TABLE 7.3.3-1

| Information Elements in a Forward Relocation Complete Notification | | | | |
|---|---|---|---|---|
| Information elements | P | Condition/Comment | IE Type | Ins. |
| Indication Flags | C | This IE shall be included if any of the flags are set to 1. Idle mode Signalling Reduction Activation Indication: This flag shall be set to 1 if the message is used for inter-RAT handover and the UE has ISR capability. This flag is set to indicate to the source MME/SGSN whether it shall maintain the UE's context and whether it shall activate ISR. Notify Source eNB Indication: This flag shall be set to 1 if the target MME receives this indication in the Handover Notify from the target eNodeB (see clause 5.5.1.2.2a of 3GPP TS 23.401 [3]). Same IWK-SCEF Selected for Monitoring Event Indication: This flag shall be set to 1 to indicate that the same IWK-SCEF is selected for Monitoring Event by the target MME/SGSN. See NOTE. | Indication | 0 |
| Private Extension | O | | Private Extension | VS |

NOTE:
If the same IWK-SCEF is selected by the target MME/SGSN, the source MME/SGSN shall not delete the Monitoring Event Configuration(s) on the IWK-SCEF.

Table 7.3.6-1 of 3GPP TS 29.274 V16.5.0 may add the following IE.

TABLE 7.3.6-1

| Information Elements in a Context Response | | | | |
|---|---|---|---|---|
| Information elements | P | Condition/Comment | IE Type | Ins. |
| IWK SCEF ID for Monitoring Event | CO | This IE shall be included on the S3/S10 interface if the source MME/SGSN has selected the IWK-SCEF to relay Monitoring Events. | Node Identifier | 0 |

Table 7.3.3-1 of 3GPP TS 29.274 V16.5.0 may be amended as following.

TABLE 7.3.7-1: Information Elements in a Context Acknowledge

| Information elements | P | Condition/Comment | IE Type | Ins. |
|---|---|---|---|---|
| Cause | M | | Cause | 0 |
| Indication flags | C | This IE shall be included if any one of the applicable flags is set to 1.<br>Applicable Flags are:<br>SGW Change Indication: This flag shall be set to 1 on the S3/S10/S16 interfaces if a new SGW has been selected. The old MME/old SGSN marks in its context that the information in the GWs and the HSS are invalid.<br>This flag shall also be set to 1 by the new AMF/new MME during the Idle mode Mobility between 5GS and EPS using N26 interface.<br>Idle mode Signalling Reduction Activation Indication: If set to 1, this flag indicates to the old system that it shall maintain the UE's contexts. This flag shall be set to 1 on the S3 interface if the Cause IE value indicates "Request accepted" and ISR is activated as specified in 3GPP TS 23.401 [3].<br>Same IWK-SCEF Selected for Monitoring Event Indication: This flag shall be set to 1 to indicate that the same IWK-SCEF is selected for Monitoring Event by the target MME/SGSN.<br>See NOTE1, NOTE x. | Indication | 0 |
| Forwarding F-TEID | CO | This IE shall be included if only one bearer context was transferred in the Context Response message and data forwarding of DL data buffered in the old SGW or (V-)SMF/UPF is required, i.e. when the BDWI flag is set in the Context Response message and the SGW is changed, during TAU/RAU procedure with SGW change and data forwarding as specified in clause 5.3.3.1A of 3GPP TS 23.401 [3]; or upon idle mode mobility between EPS and 5GS with data forwarding, as specified in clauses 4.11.1.3.2A, 4.11.1.3.3A, 4.23.12.2a and 4.23.12.3a of 3GPP TS 23.502 [83].<br>The interface type of the Forwarding F-TEID should be set to either:<br>23 ("SGW/UPF GTP-U interface for DL data forwarding") for indirect forwarding,<br>0 ("S1-U eNodeB GTP-U interface") or 3 ("S12 RNC GTP-U interface"), if the eNB or RNC supports such forwarding, or<br>15 ("S4 SGSN GTP-U interface"). | F-TEID | 0 |
| Bearer Contexts | CO | This IE shall be included if multiple bearer contexts were transferred in the Context Response message and data forwarding of DL data buffered in the old SGW or (V-)SMF/UPF is required, i.e. when the BDWI flag is set in the Context Response message and the SGW is changed, during TAU/RAU procedure with SGW change and data forwarding as specified in the clause 5.3.3.1A of 3GPP TS 23.401 [3]; or upon idle mode mobility between EPS and 5GS, as specified in clauses 4.11.1.3.2A, 4.11.1.3.3A, 4.23.12.2a and 4.23.12.3a of 3GPP TS 23.502 [83].<br>Several IEs with this type and instance value may be included as necessary to represent a list of Bearers. | Bearer Context | 0 |
| SGSN Number | CO | This IE shall be included on the S16/S3 interface if the PMTSMI flag in the Context Response message is set to 1 | Node Number | 0 |
| MME number for MT SMS | CO | This IE shall be included on the S10/S3 interface if the PMTSMI flag in the Context Response message is set to 1. | Node Number | 1 |
| SGSN Identifier for MT SMS | CO | This IE shall be included on the S16/S3 interface if the target S4-SGSN supports the Gdd reference point and if the PMTSMI flag in the Context Response message is set to 1. | Node Identifier | 0 |

-continued

TABLE 7.3.7-1: Information Elements in a Context Acknowledge

| Information elements | P | Condition/Comment | IE Type | Ins. |
|---|---|---|---|---|
| MME Identifier for MT SMS | CO | This IE shall be included on the S10/S3 interface if the target MME supports the SGd reference point and if the PMTSMI flag in the Context Response message is set to 1. | Node Identifier | 1 |
| Private Extension | O | | Private Extension | VS |

NOTE1:
For the Indication Flags, the combination (SGW Change Indication, Idle mode signalling Activation Indication) = 1, 1 shall be considered as an error if received.
NOTEx:
If the same IWK-SCEF is selected by the target MME/SGSN, the source MME/SGSN shall not delete the Monitoring Event Configuration(s) on the IWK-SCEF.

Clause 8.12 of 3GPP TS 29.274 V16.5.0 may be amended as following. Indication is coded as bellow table.

| | Bits | | | | | | | |
|---|---|---|---|---|---|---|---|---|
| Octets | 8 | 7 | 6 | 5 | 4 | 3 | 2 | 1 |
| 1 | Type = 77 (decimal) | | | | | | | |
| 2 to 3 | Length = n | | | | | | | |
| 4 | Spare | | | | | | Instance | |
| 5 | DAF | DTF | HI | DFI | OI | ISRSI | ISRAI | SGWCI |
| 6 | SQCI | UIMSI | CFSI | CRSI | P | PT | SI | MSV |
| 7 | RetLoc | PBIC | SRNI | S6AF | S4AF | MBMDT | ISRAU | CCRSI |
| 8 | CPRAI | ARRL | PPOF | PPON/ PPEI | PPSI | CSFBI | CLII | CPSR |
| 9 | NSI | UASI | DTCI | BDWI | PSCI | PCRI | AOSI | AOPI |
| 10 | ROAAI | EPCOSI | CPOPCI | PMTSMI | S11TF | PNSI | UNACCSI | WPMSI |
| 11 | 5GSNN26 | REPREFI | 5GSIWK | EEVRSI | LTEMUI | LTEMPI | ENBCRSI | TSPCMI |
| 12 | CSRMFI | MTEDTN | MTEDTA | N5GNMI | 5GCNRS | 5GCNRI | 5SRHOI | ETHPDN |
| 13 | Spare | Spare | Spare | Spare | SISSME | NSENBI | IDFUPF | EMCI |
| 14 to (n + 4) | These octet(s) is/are present only if explicitly specified | | | | | | | |

The following bits within Octet 13 shall indicate:

Bit 8 to y: Spare, for future use and set to 0.

Bit x—SISSME (Same IWK-SCEF Selected for Monitoring Event Indication): if this bit is set to 1, it indicates that same IWK-SCEF is selected by target MME/SGSN for Monitoring Event.

Bit 3—NSENBI (Notify Source eNodeB Indication): if this bit is set to 1, it indicates that the source MIME shall send a Handover Success to the source eNodeB (see clause 5.5.1.2.2a of 3GPP TS 23.401 [3]).

Bit 2—IDFUPF (Indirect Data Forwarding with UPF Indication): if this bit is set to 1, it indicates that indirect data forwarding is required for user plane routes from/to a UPF.

Bit 1—EMCI (Emergency PDU Session Indication): if this bit is set to 1, it indicates the UE has emergency PDU session, as specified in 3GPP TS 23.216 [43].

Clause 8.107 of 3GPP TS 29.274 V16.5.0 may be amended as following.

8.107 Node Identifier

Node Identifier shall be coded as below table.

| Octets | Bits | | | | | | | |
|---|---|---|---|---|---|---|---|---|
| | 8 | 7 | 6 | 5 | 4 | 3 | 2 | 1 |
| 1 | Type = 176 (decimal) | | | | | | | |
| 2 to 3 | Length = n | | | | | | | |
| 4 | Spare | | | | Instance | | | |
| 5 | Length of Node Name | | | | | | | |
| 6 to p | Node Name | | | | | | | |
| (p + 1) | Length of Node Realm | | | | | | | |
| (p + 2) to q | Node Realm | | | | | | | |
| (q + 1) to (n + 4) | These octet(s) is/are present only if explicitly specified | | | | | | | |

The Node Identifier shall contain the Diameter Identity of the node.

If the Node Identifier contains a SGSN Identifier then:
the Node Name shall be coded as the Diameter identity of the SGSN as defined in clause 6.4.13 of 3GPP TS 29.173 [57] and;
the Node Realm shall be coded as the Diameter realm identity of the SGSN and as defined in clause 6.4.14 of 3GPP TS 29.173 [57] and;
Both the Node Name and the Node Realm shall be present and neither the Length of Node Name nor the Length of Node Realm shall be zero.
If the Node Identifier contains a MME Identifier then:
the Node Name shall be coded as the Diameter identity of the MME as defined in clause 6.4.4 of 3GPP TS 29.173 [57] and;
the Node Realm shall be coded as the Diameter realm identity of the MIME as defined in clause 6.4.12 of 3GPP TS 29.173 [57] and;
Both the Node Name and the Node Realm shall be present and neither the Length of Node Name nor the Length of Node Realm shall be zero.
If the Node Identifier contains a 3GPP AAA Server Identifier then:
the Node Name shall be coded as the 3GPP-AAA-Server-Name as defined in clause 8.2.3.24 of 3GPP TS 29.273 [68] and;
the Node Realm shall be coded as the Diameter realm of the 3GPP AAA server in the format of a Diameter identity as defined in IETF RFC 3588 [39].
If the Node Identifier contains an SCEF/IWK-SCEF information, then:
the Node Name shall be coded as the SCEF-ID as defined in clause 8.4.5 of 3GPP TS 29.336 [69] and;
the Node Realm shall be coded as the Diameter realm of the SCEF as defined in clause 7.3.207 of 3GPP TS 29.272 [70].

Embodiments herein offer many advantages, of which a non-exhaustive list of examples follows. Some embodiments herein proposes an enhancement mechanism for MEC update in Inter-node mobility procedures. Some embodiments herein may use existing signaling (messages), no extra messages are introduced. Some embodiments herein may avoid useless data accumulated on the IWK-SCEF node. Some embodiments herein may ensure that MEC can be correctly updated and avoid unexpected MEC deletion on the IWK-SCEF in Inter-node mobility procedures. Some embodiments herein may simplify the signaling interaction and save the signaling interaction between an old mobile management node (such as SGSN/MME) and an old IWK-SCEF when a new mobile management node (such as SGSN/MME) and the old mobile management node are using the same IWK-SCEF. Some embodiments herein may save the resource of IWK-SCEF since IWK-SCEF does not need to maintain two different monitoring event configurations in the Inter-node mobility procedures and IWK-SCEF can keep original handling mechanism unchanged. The embodiments herein are not limited to the features and advantages mentioned above. A person skilled in the art will recognize additional features and advantages upon reading the following detailed description.

Figure 12:
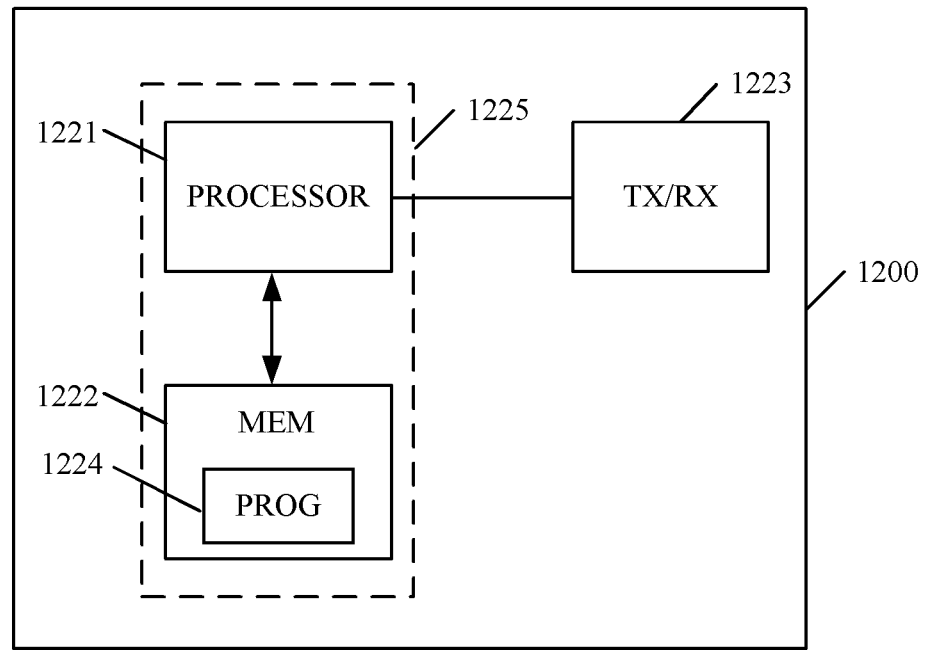
FIG. 12 is a block diagram showing an apparatus suitable for practicing some embodiments of the disclosure.

FIG. 12 is a block diagram showing an apparatus suitable for practicing some embodiments of the disclosure. For example, any one of the first mobile management node, the second mobile management node, the third mobile management node and the IWK-SCEF as described above may be implemented as or through the apparatus 1200.

The apparatus 1200 comprises at least one processor 1221, such as a digital processor (DP), and at least one memory (MEM) 1222 coupled to the processor 1221. The apparatus 1220 may further comprise a transmitter TX and receiver RX 1223 coupled to the processor 1221. The MEM 1222 stores a program (PROG) 1224. The PROG 1224 may include instructions that, when executed on the associated processor 1221, enable the apparatus 1220 to operate in accordance with the embodiments of the present disclosure. A combination of the at least one processor 1221 and the at least one MEM 1222 may form processing means 1225 adapted to implement various embodiments of the present disclosure.

Various embodiments of the present disclosure may be implemented by computer program executable by one or more of the processor 1221, software, firmware, hardware or in a combination thereof.

The MEM 1222 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1221 may be of any type suitable to the local technical environment, and may include one or more of general purpose computers, special purpose computers, microprocessors, digital signal processors (DSPs) and processors based on multicore processor architecture, as non-limiting examples.

In an embodiment where the apparatus is implemented as or at the first mobile management node, the memory 1222 contains instructions executable by the processor 1221, whereby the first mobile management node operates according to any step of any of the methods related to the first mobile management node as described above.

In an embodiment where the apparatus is implemented as or at the second mobile management node, the memory 1222 contains instructions executable by the processor 1221, whereby the second mobile management node operates according to any step of the methods related to the second mobile management node as described above.

In an embodiment where the apparatus is implemented as or at the third mobile management node, the memory 1222 contains instructions executable by the processor 1221, whereby the third mobile management node operates according to any step of the methods related to the third mobile management node as described above.

In an embodiment where the apparatus is implemented as or at the IWK-SCEF, the memory 1222 contains instructions executable by the processor 1221, whereby the IWK-SCEF operates according to any step of the methods related to the IWK-SCEF as described above.

The term unit or module may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the first mobile management node, the second mobile management node, the third mobile management node and the IWK-SCEF may not need a fixed processor or memory, any computing resource and storage resource may be arranged from the first mobile management node, the second mobile management node, the third mobile management node and the IWK-SCEF in the communication system. The introduction of virtualization technology and network computing technology may improve the usage efficiency of the network resources and the flexibility of the network.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform one or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a first mobile management node, comprising:

receiving information regarding a first interworking service capability exposure function (IWK-SCEF) from a second mobile management node;

determining whether the first mobile management node and the second mobile management node use a same IWK-SCEF based on the information regarding the first IWK-SCEF; and sending an indication of whether the first mobile management node and the second mobile management node use the same IWK-SCEF to the second mobile management node, wherein the indication is comprised in at least one of:

a Context Acknowledge message;

a Forward Relocation Response; or a Forward Relocation Complete Notification message.

2. The method according to claim 1, wherein the step of receiving and determining are performed during a mobility procedure of a terminal device moving from the first mobile management function to the second mobile management function.

3. The method according to claim 2, wherein the mobility procedure comprises at least one of a tracking area update procedure or a handover procedure.

4. The method according to claim 2, further comprising:
in response to a determination that the first mobile management node and the second mobile management node use the same IWK-SCEF, skipping sending a deletion notification of a monitoring event configuration related to the terminal device to the same IWK-SCEF; or in response to a determination that the first mobile management node and the second mobile management node do not use the same IWK-SCEF, sending the deletion notification of the monitoring event configuration related to the terminal device to the IWK-SCEF used by the first mobile management node.

5. The method according to claim 4, wherein the deletion notification of the monitoring event configuration is comprised in an inform IWK-SCEF message.

6. The method according to claim 1, wherein the step of receiving and determining are performed during a mobility procedure of a terminal device moving from the second mobile management function to the first mobile management function.

7. The method according to claim 6, wherein the mobility procedure comprises at least one of a tracking area update procedure or a handover procedure.

8. The method according to claim 6, wherein the information regarding the first IWK-SCEF is comprised in at least one of:
a Context Response; or
a Forward Relocation Request.

9. The method according to claim 6, further comprising:
selecting an IWK-SCEF based on the information regarding the first IWK-SCEF.

10. The method according to claim 9, wherein selecting the IWK-SCEF based on the information regarding the first IWK-SCEF comprises:
selecting the same IWK-SCEF as the IWK-SCEF used by the second mobile management node.

11. The method according to claim 1, wherein when the second mobile management node uses the first IWK-SCEF, the information regarding the first IWK-SCEF comprises the Diameter HOST and REALM information of the first IWK-SCEF.

12. The method according to claim 1, wherein determining whether the first mobile management node and the second mobile management node use the same IWK-SCEF based on the information regarding the first IWK-SCEF comprises:
when the first mobile management node uses the first IWK-SCEF and the information regarding the first IWK-SCEF indicates that the second mobile management node uses the first IWK-SCEF, determining that the first mobile management node and the second mobile management node use the same IWK-SCEF;
when the first mobile management node uses another IWK-SCEF and the information regarding the first IWK-SCEF indicates that the second mobile management node uses the first IWK-SCEF, determining that the first mobile management node and the second mobile management node do not use the same IWK-SCEF; or when the first mobile management node uses the first IWK-SCEF and the information regarding the first IWK-SCEF indicates that the second mobile management node does not use any IWK-SCEF, determining that the first mobile management node and the second mobile management node do not use the same IWK-SCEF.

13. The method according to claim 1, wherein the first mobile management node comprises serving general packet radio service support node (SGSN) or mobile management entity (MME).

14. A method performed by a second mobile management node, comprising:
sending information regarding a first interworking service capability exposure function (IWK-SCEF) to a first mobile management node; and
receiving an indication of whether the first mobile management node and the second mobile management node use the same IWK-SCEF from the first mobile management node, wherein the indication is comprised in at least one of:
a Context Acknowledge message;
a Forward Relocation Response; or
a Forward Relocation Complete Notification message, and
wherein the information regarding the first IWK-SCEF is used to determine whether the first mobile management node and the second mobile management node use a same IWK-SCEF.

15. The method according to claim 14, wherein the step of sending is performed during a mobility procedure of a terminal device moving from the first mobile management function to the second mobile management function.

16. The method according to claim 15, wherein the mobility procedure comprises at least one of a tracking area update procedure or a handover procedure.

17. The method according to claim 14, wherein the step of sending is performed during a mobility procedure of a terminal device moving from the second mobile management function to the first mobile management function.

18. The method according to claim 17, wherein the mobility procedure comprises at least one of a tracking area update procedure or a handover procedure.

19. The method according to claim 17, further comprising:
in response to the first mobile management node and the second mobile management node use the same IWK-SCEF, skipping sending a deletion notification of a monitoring event configuration related to the terminal device to the same IWK-SCEF; or
in response to the first mobile management node and the second mobile management node does not use the same IWK-SCEF, sending the deletion notification of the monitoring event configuration related to the terminal device to the IWK-SCEF used by the second mobile management node.

20. The method according to claim 19, wherein the deletion notification of the monitoring event configuration is comprised in an inform IWK-SCEF message.

21. The method according to claim 14, wherein when the second mobile management node uses the first IWK-SCEF, the information regarding the first IWK-SCEF comprises the Diameter HOST and REALM information of the first IWK-SCEF.

22. A first mobile management node, comprising:

a processor; and a memory coupled to the processor, said memory containing instructions executable by said processor, whereby said first mobile management node is operative to:

receive information regarding a first interworking service capability exposure function (IWK-SCEF) from a second mobile management node;

determine whether the first mobile management node and the second mobile management node use a same IWK-SCEF based on the information regarding the first IWK-SCEF; and send an indication of whether the first mobile management node and the second mobile management node use the same IWK-SCEF to the second mobile management node, wherein the indication is comprised in at least one of:

a Context Acknowledge message;

a Forward Relocation Response; or a Forward Relocation Complete Notification message.

23. A second mobile management node, comprising:

a processor; and a memory coupled to the processor, said memory containing instructions executable by said processor, whereby said second mobile management node is operative to:

send information regarding a first interworking service capability exposure function (IWK-SCEF) to a first mobile management node; and receive an indication of whether the first mobile management node and the second mobile management node use the same IWK-SCEF from the first mobile management node, wherein the indication is comprised in at least one of:

a Context Acknowledge message;

a Forward Relocation Response; or a Forward Relocation Complete Notification message, and wherein the information regarding the first IWK-SCEF is used to determine whether the first mobile management node and the second mobile management node use a same IWK-SCEF.

* * * * *